US010346916B2

(12) United States Patent
Sandre et al.

(10) Patent No.: US 10,346,916 B2
(45) Date of Patent: Jul. 9, 2019

(54) SYSTEMS AND METHODS FOR AUTOMATICALLY GENERATING ORDER DATA BASED ON SOCIAL MEDIA MESSAGING

(71) Applicant: The Toronto-Dominion Bank, Toronto (CA)

(72) Inventors: Bruno Sandre, Toronto (CA); Matthew Hamilton, Toronto (CA); Jonathan K. Barnett, Oakville (CA); Paul Mon-Wah Chan, Markham (CA); John Jong Suk Lee, Waterloo (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 350 days.

(21) Appl. No.: 15/228,705

(22) Filed: Aug. 4, 2016

(65) Prior Publication Data
US 2017/0039608 A1 Feb. 9, 2017

Related U.S. Application Data

(60) Provisional application No. 62/201,392, filed on Aug. 5, 2015.

(51) Int. Cl.
*G06Q 30/00* (2012.01)
*G06Q 40/04* (2012.01)
(Continued)

(52) U.S. Cl.
CPC ............. *G06Q 40/04* (2013.01); *G06Q 40/06* (2013.01); *G06Q 50/01* (2013.01); *H04L 41/22* (2013.01);
(Continued)

(58) Field of Classification Search
CPC ........ G06Q 40/00; G06Q 40/04; G06Q 40/06; G06Q 30/06; G06Q 30/0601–0643; G06Q 30/08; G06Q 50/01
See application file for complete search history.

(56) References Cited

U.S. PATENT DOCUMENTS 4,674,044 A 6/1987 Kalmus
5,257,185 A 10/1993 Farley
(Continued)

FOREIGN PATENT DOCUMENTS

WO WO2014/041541 3/2014

OTHER PUBLICATIONS

Can emoji passwords confuse hackers? Todd, Deborah M. TCA Regional News; Chicago [Chicago]Jul. 3, 2015. (Year: 2015).*

Primary Examiner — William J Allen
(74) Attorney, Agent, or Firm — Duane Morris LLP

(57) ABSTRACT

The disclosed embodiments include computerized methods and systems that facilitate automate trade-order entry and execution based on social media messaging. In one embodiment, an apparatus may receive, from a social-networking service, social media data that includes various social media messages associated with social-networking accounts of various users. The apparatus may detect an occurrence of a predetermined element of content within a first social media message associated with a social networking account of a first user, and may extract data identifying at least one parameter of an action from the first social media message. The apparatus may generate proposed transaction parameters that include the at least one extracted action parameter, and in response to a confirmation of the proposed transaction parameters, the apparatus may generate one or more electronic commands to initiate a performance of the action in accordance with the confirmed transaction parameters.

20 Claims, 9 Drawing Sheets

(51) Int. Cl.
   *H04L 12/58* (2006.01)
   *G06Q 40/06* (2012.01)
   *H04L 29/06* (2006.01)
   *H04L 29/08* (2006.01)
   *G06Q 50/00* (2012.01)
   *H04L 12/24* (2006.01)

(52) U.S. Cl.
   CPC ............ *H04L 51/32* (2013.01); *H04L 63/083* (2013.01); *H04L 63/102* (2013.01); *H04L 67/12* (2013.01); *H04L 67/306* (2013.01)

(56) References Cited

U.S. PATENT DOCUMENTS

| | | |
|---|---|---|
| 5,297,032 A | 3/1994 | Trojan |
| 5,583,763 A | 12/1996 | Atcheson |
| 5,668,966 A | 9/1997 | Ono |
| 5,689,651 A | 11/1997 | Lozman |
| 5,717,865 A | 2/1998 | Stratmann |
| 5,761,656 A | 6/1998 | Ben-Shachar |
| 5,794,178 A | 8/1998 | Caid |
| 5,970,479 A | 10/1999 | Shepherd |
| 5,989,034 A | 11/1999 | Ninomiya |
| 6,021,397 A | 2/2000 | Jones |
| 6,125,391 A | 9/2000 | Meltzer et al. |
| 6,134,535 A | 10/2000 | Belzberg |
| 6,134,536 A | 10/2000 | Shepherd |
| 6,157,918 A | 12/2000 | Shepherd |
| 6,175,824 B1 | 1/2001 | Breitzman |
| 6,208,339 B1 | 3/2001 | Atlas |
| 6,208,985 B1 | 3/2001 | Krehel |
| 6,249,785 B1 | 6/2001 | Paepke |
| 6,313,833 B1 | 11/2001 | Knight |
| 6,405,204 B1 | 6/2002 | Baker |
| 6,430,542 B1 | 8/2002 | Moran |
| 6,484,152 B1 | 11/2002 | Robinson |
| 6,601,044 B1 | 7/2003 | Wellman |
| 6,611,814 B1 * | 8/2003 | Lee ................ G06Q 30/02 705/26.1 |
| 6,615,188 B1 * | 9/2003 | Breen ............... G06Q 40/04 705/37 |
| 6,697,800 B1 | 2/2004 | Jannink |
| 6,711,552 B1 | 3/2004 | Kay |
| 6,772,132 B1 | 8/2004 | Kemp, II et al. |
| 6,901,383 B1 | 5/2005 | Ricketts |
| 7,191,144 B2 | 3/2007 | White |
| 7,275,046 B1 | 9/2007 | Tritt |
| 7,356,518 B2 | 4/2008 | Bonabeau |
| 7,373,324 B1 | 5/2008 | Engin |
| 9,576,270 B1 | 2/2017 | Afshar |
| 2009/0017795 A1 | 1/2009 | Guichard |
| 2010/0295803 A1 | 11/2010 | Kim |
| 2011/0179114 A1 * | 7/2011 | Dilip ............. G06F 17/30867 709/204 |
| 2012/0110501 A1 | 5/2012 | Baek |
| 2013/0063576 A1 | 3/2013 | Okubo |
| 2013/0081056 A1 | 3/2013 | Hu |
| 2013/0091013 A1 * | 4/2013 | Wang ............. G06Q 30/0241 705/14.53 |
| 2013/0204882 A1 * | 8/2013 | Blaschak .......... G06F 17/3053 707/751 |
| 2013/0318005 A1 | 11/2013 | Bass |
| 2014/0059424 A1 | 2/2014 | Kim |
| 2014/0189536 A1 * | 7/2014 | Lange ................ H04L 67/22 715/753 |
| 2015/0007104 A1 | 1/2015 | Zhu |
| 2015/0046314 A1 | 2/2015 | Repasi |
| 2015/0199763 A1 | 7/2015 | Birkhead |
| 2016/0019659 A1 | 1/2016 | Doganata |
| 2016/0055235 A1 * | 2/2016 | Zhang ............ G06F 17/30684 707/749 |
| 2016/0092771 A1 * | 3/2016 | Buckley ............. H04L 67/02 706/52 |

\* cited by examiner

US 10,346,916 B2

SYSTEMS AND METHODS FOR AUTOMATICALLY GENERATING ORDER DATA BASED ON SOCIAL MEDIA MESSAGING

CROSS-REFERENCE TO RELATED APPLICATIONS

This application claims the benefit of U.S. Provisional Patent Application No. 62/201,392, filed Aug. 5, 2015, which is expressly incorporated by reference herein in its entirety.

TECHNICAL FIELD

The disclosed embodiments generally relate to computerized systems and methods that facilitate automated order entry and execution based on social media messaging.

BACKGROUND

Today, timely and accurate execution of trade orders is essential not only for financial institutions, but also for clients of these financial institutions and for individual investors, Further, many investors adopt social media technologies as real-time sources of information and news, which may inform the investors' decisions related to investment portfolio management. As the speed of these social-media-based sources of information and news increases in parallel with the speed of electronic trading platforms, inefficiencies related to manual trade-order entry and execution may place individual investors at a competitive disadvantage within the marketplace.

SUMMARY

The disclosed embodiments relate to computerized systems and methods that facilitate automated order entry and execution based on social media messaging.

In an embodiment, an apparatus includes a communications module, at least one processor coupled to the communications module, and a memory coupled to the at least one processor and storing executable instructions that, when executed by the at least one processor, cause the at least one processor to receive social media data from at least one social networking server through the communications module. The social networking server may be connected to the apparatus across a communications network, and the social media data may include a plurality of social media messages. The executed instructions may also cause the at least one processor to detect an occurrence of at least one predetermined element of content within a first one of the social media messages. In some aspects, the first social media message may be associated with a social networking account, and the predetermined content element may specify a performance of at least one action. The executed instructions may also cause the at least one processor to extract, from the first social media message, data identifying at least one parameter of the action, generating proposed parameters for the action based on at least the extracted data, and receiving, from a device associated with the social networking account, information confirming the proposed parameters. In additional aspects, the proposed parameters may include the at least one parameter extracted from the social media message. The executed instructions may also cause the at least one processor to generate one or more electronic commands to initiate the performance of the action in accordance with the confirmed parameters.

In other embodiments, a computer-implemented method includes receiving, by one or more processors, social media data from at least one social networking server. The social networking server may be connected to the apparatus across a communications network, and the social media data may include a plurality of social media messages. The method may also include detecting, by the one or more processors, an occurrence of at least one predetermined element of content within a first one of the social media messages. In some aspects, the first social media message may be associated with a social networking account, and the predetermined content element may specify a performance of at least one action. Further, the method may extract, by the one or more processors, and from the first social media message, data identifying at least one parameter of the action, generate, by the one or more processors, proposed parameters for the action based on at least the extracted data, and receive, by the one or more processors, and from a device associated with the social networking account, information confirming the proposed parameters. In further aspects, the proposed parameters may include the at least one parameter extracted from the social media message.

In additional embodiments, a system may include first and second communications devices connected across a communications network. The first computing device may receive social media data from at least one social networking server across the communications network, the social media data comprising a plurality of social media messages. The second computing device may include at least one processor and a memory coupled to the at least one processor and for storing executable instructions that, when executed by the at least one processor, cause the at least one processor to detect an occurrence of at least one predetermined element of content within a first one of the social media messages received by the first computing device. The first social media message may be associated with a social networking account, and the predetermined content element may specify a performance of at least one action. The executed instructions may also cause the at least one processor to extract, from the first social media message, data identifying at least one parameter of the action, and generate proposed parameters for the action based on at least the extracted data. The proposed parameters may, in some aspects, include the at least one parameter extracted from the social media message. The executed instructions may also cause the at least one processor to receive, from a device associated with the social networking account, information confirming the proposed parameters from the user, and generate one or more electronic commands to initiate the performance of the action in accordance with the confirmed parameters.

DESCRIPTION OF THE DRAWINGS

Figure 1:
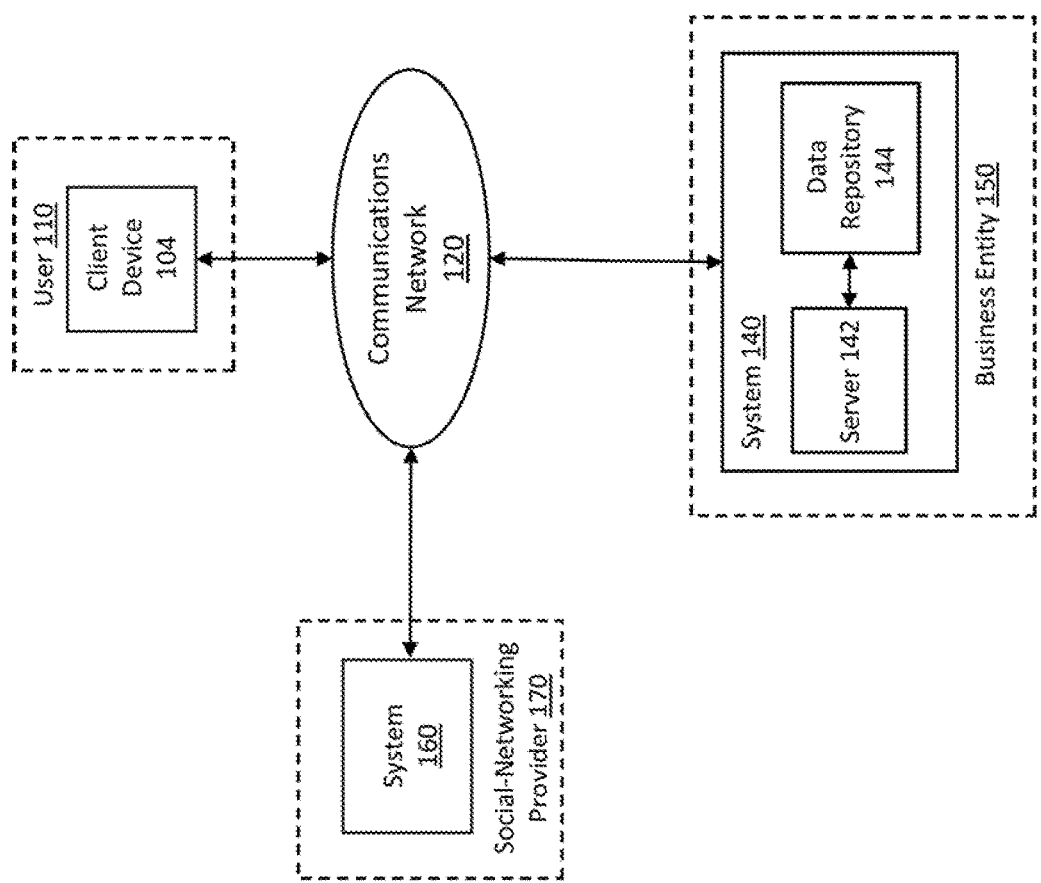
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

I. Exemplary Computing Environments, Networks, Systems, and Devices

FIG. 1 illustrates an exemplary computing environment 100 consistent with certain disclosed embodiments. In one aspect, computing environment 100 may include client device 104, system 140, social networking system 160, and a communications network 120 connecting one or more of the components of environment 100.

a. Exemplary Client Devices

In one embodiment, client device 104 may be a computing device, such as, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, client device 104 may be associated with one or more users, such as user 110. For instance, user 110 may operate client device 104 and may do so to cause client device 104 to perform one or more operations consistent with the disclosed embodiments.

Client device 104 may include one or more tangible, non-transitory memories that store data and/or software instructions, and one or more processors configured to execute software instructions. Client device 104 may include one or more display devices that display information to a user and one or more input device(s) to allow the user to input information to client device 104 (e.g., keypad, keyboard, touchscreen, voice activated control technologies, or any other type of known input device).

In one aspect, client device 104 may store in memory one or more software applications that run on client device 104 and are executed by the one or more processors. In some aspects, client device 104 may store software applications that, when executed by one or more processors, perform operations that allow user 110 (through client device 104) to interact with business entity 150 through, for example, a computing device, such as server 142 or other computing component(s) of system 140. In certain aspects, additional software applications may, when executed by client device 104, cause client device 104 to send information to be stored in a memory remote to client device 104 and/or receive information stored in a memory remote to client device 104 (e.g., memory associated with server 142, such as data repository 144). In other aspects, additional software applications may, when executed by client device 104, cause client device 104 to establish communications with social networking system 160 (e.g., through a corresponding application programming interface (API)) and facilitate user 110's interaction with an electronic social network through data exchanged with social networking system 160. The disclosed embodiments are, however, not limited to such exemplary configurations, and in further embodiments, client device 104 may be configured in any additional or alternate manner to enable communication and data exchange with system 140 across network 120.

b. Exemplary Computer Systems

System 140 may be a computing system configured to execute software instructions to perform one or more operations consistent with disclosed embodiments. In one aspect, system 140 may be associated with a business entity 150 (e.g., a financial institution) that provides financial accounts, financial services transactions, and investment services one or more users (e.g., customers of business entity 150). In some aspects, system 140 may be a distributed system that may include computing components distributed across one or more networks, such as network 120, or other networks.

In one aspect, system 140 may include computing components configured to store, maintain, and generate data and software instructions. For example, system 140 may include one or more servers (e.g., server 142) and tangible, non-transitory memory devices (e.g., data repository 144). Server 142 may include one or more computing devices that may be configured to execute software instructions to perform one or more processes consistent with the disclosed embodiments. In one example, server 142 may be a computing device that executes software instructions that perform operations that provides information to one or more other components of computing environment 100.

In one embodiment, server 142 may include a computer (e.g., a server, personal computer, network computer, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital banking or investment portal, and services consistent with disclosed embodiments. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104 (e.g., through a corresponding application programming interface (API)). For example, client device 104 may execute an application program associated with and provided by business entity 150, such a mobile banking and/or investment application, to provide services to user 110 consistent with the disclosed embodiments. In some instances, server 142 may provide information to client device 104 (e.g., through the API associated with the executed application program), and client device 104 may be configured by the executed application program to present portions of the information to user 110 through a corresponding graphical user interface (GUI).

In further aspects, server 142 (or other computing components of system 140) may be configured to provide to client device 104 (and/or receive from client device 104)

information associated with services provided by business entity 150. For example, client device 104 may receive the transmitted information, and store portions of the information in locally accessible storage device and/or network-accessible storage devices and data repositories (e.g., cloud-based storage). In one instance, client device 104 may execute stored instructions (e.g., an application program, a web browser, and/or a mobile banking application) to process portions of the stored data and render portions of the stored data for presentation to user 110. In other instances, server 142 may be incorporated as a corresponding node in a distributed network, and additionally or alternatively, as a corresponding networked server in a cloud-computing environment. Furthermore, server 142 may communicate via network 120 with one or more additional servers (not shown), which may facilitate the distribution of processes for parallel execution by the additional servers.

c. Exemplary Data Repositories and Stored Data

Data repository 144 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments. Data repository 144 may also be configured to store information relating to business entity 150, e.g., a financial institution. For example, data repository 144 may be configured to store data identifying customers of the financial institution, financial account data associated with the customers, investment portfolio data associated with the customers, and data indicative of social networking activity of the customers.

In one aspect, data repository 144 may store customer data that uniquely identifies customers of a financial institution associated with system 140. By way of example, a customer of the financial institution (e.g., user 110) may access a web page associated with system 140 (e.g., through a web server executed by a corresponding front end), and may register for digital banking services and provide data, which may be linked to user 110 and stored as customer data within data repository 144. The stored customer data may, for example, include personal information, government-issued identifiers, employment information, and contact information. Customer data 144A may also include authentication credentials associated with registered users of the financial institution (e.g., a user name, a user-specified password, a system-generated password, an alphanumeric identification number (e.g., a PIN number) specified by user 110 or assigned by financial system 140, and information facilitating enhanced authentication techniques).

Data repository 144 may also store account data identifying one or more accounts of users of the financial institution associated with system 140. In one embodiment, account identification information may include information associated with a financial service account, such as, for example, a checking account, a savings account, a revolving credit line, an account linked to a credit or debit card, an investment account, a brokerage account, and any additional or alternate account provided or supported by the financial institution.

In additional aspects, data repository 144 may store portfolio data that identifies investment portfolios held by customers of the financial institution. In one aspect, the stored portfolio data may include information identifying a real or "actual" investment portfolio composed of actual financial positions held by a user in various securities. In further aspects, the portfolio data may include information identifying one or more "virtual" investment portfolios composed of "simulated" positions held by user 110 in various securities. In some aspects, data repository 144 may also store portfolio data identifying one or more "watch lists" that specify various securities monitored by user 110 and corresponding simulated positions held by user 110 in these various securities.

In certain embodiments, the securities associated with user 110's actual investment portfolio, virtual investment portfolio, and watch list may represent various equity and debt securities. In some aspects, equity and debt securities consistent with the disclosed embodiments may include, but are not limited to, shares of common stock, corporate or governmental bonds, mutual funds, bond funds, preferred stock, debentures, warrants, options, exchange traded funds (ETFs), and any additional or alternate equity or debt security associated with a recognized and/or registered security identifier, Further, portfolio data 144C may include information identifying the simulated or actual positions held by user 110 in these securities, as well as information identifying a schedule for providing electronic updates to user 110 regarding a performance of these securities. By way of example, the electronic updates may be provided by system 140 to client device 104 in real-time or in near-real time. For instance, one or more of the near-real-time updates provide by system 140 may include frequent and/or cached updates of real-time prices of the securities, which may be stale by a predefined time (every second, every 30 seconds, every minute, etc.). In other instances, system 140 may be configured to provide one or more of the electronic updates to client device 104 at predetermined intervals (e.g., daily, weekly, monthly, quarterly, etc.) and/or in response to customer-specific events. Further, in some instances, system 140 may delay the provision of one or more of the electronic updates to client device 104 by a predetermined time period (e.g., by fifteen or twenty minutes), and additionally or alternatively, system 140 may provide one or more of the electronic updates to client device 104 at an end of a trading day on a corresponding market.

Data repository 144 may also store social networking data indicative of an interaction of customers of the financial institution with one or more social networks (e.g., Twitter™, Facebook™, FourSquare™, Instagram™, Tumblr™, LinkedIn™, etc.). For example, user 110 may be a regular user of Twitter™, and upon registration for digital banking services, user 110 may provide system 140 with a corresponding Twitter™ handle or authentication credentials associated with user 110's Twitter™ account. Further, through a web page or other interface presented by client 104, user 110 may grant system 140 access to information associated with user 110's Facebook™ and Twitter™ accounts, which includes, but is not limited to the individuals and entities followed by user 110 (e.g., by providing system 140 with corresponding authentication credentials, which include, but are not limited to user names and/or handles and passwords).

In certain aspects, system 140 may establish customer profile data for one of more of the customers of business entity 150 (e.g., a financial institution), which system 140 may be stored in data repository 144 and additionally or alternatively, in an external data repository accessible to system 140 across network 120 (e.g., cloud-based storage). For example, system 140 may establish a customer profile data for user 110 that includes all or a portion of user 110's stored customer data, account data, portfolio data, and/or social networking data. In some aspects, user 110 may access, update, and/or modify portions of the stored customer profile data through a web page or other graphical user interface (GUI) provided by system 140 and rendered for presentation by client device 104. In other aspects, system 140 may execute software instruction that dynamically modify and/or update user 110's customer profile data based on financial services transactions and other financial services initiated and/or executed by system 140 on user 110's behalf.

In further aspects, user 110's customer profile data may include information identifying one or more digital banking and investment services and programs associated with user 110 and/or user 110's accounts (e.g., as held by the financial institution associated with business entity 150). For example, user 110 may elect to participate in the exemplary processes for automated, social-media-based entry and execution of trade orders described below (e.g., as input provided to a web page or other GUI presented by client device 104). In certain instances, and in response to user 110's election, system 140 may update user 110's customer profile to include information indicative of user 110's decision to participate in the exemplary automated, social-media-based trade order entry and execution processes.

In some embodiments, user 110's customer profile may also include information identifying one or more preferences and/or settings specified by user 110 for the digital banking and investment services and programs in which user 110 participates. By way of example, system 140 may provide, to client device 104 for presentation for user 110, one or more selectable preferences and settings associated with the exemplary automated, social-media-based trade order entry and execution processes. For example, system 140 may enable user 110 to select (e.g., through a web page or GUI provided by system 140 and presented by client device 104) one or more social media accounts that may be accessible to the automated, social-media-based trade order entry and execution processes described below.

Further, through a web page or GUI provided by system 140 and presented by client device 104, user 110 may specify that system 140 should initiate execution of automatically entered trades having trade parameters that fall within user-specified threshold values and/or that involved predetermined securities (e.g., user-specified stocks, etc.). In other aspects, through the web page or GUI, user 110 may specify default values for one or more trade parameters associated with a proposed trade order. For example, user 110 may provide, as input to the web page or GUI presented by client device 104, information identifying one or more favorite accounts that fund and/or receive proceeds from executed trade orders, and further, information mapping one or more accounts held by user 110 to corresponding hashtags or predetermined elements of content, which may be included in social media messages requesting proposed trade orders. In certain aspects, system 140 may store the user-established default values, favorites, and mappings as preference data within data repository 144.

d. Exemplary Social Networking Systems

Referring back to FIG. 1, social networking system 160 may be a computing system configured to execute software instructions to perform one or more operations consistent with disclosed embodiments. In one aspect, social networking system 160 may be associated with one or more providers 170 of social media and social networks (e.g., Twitter™, Facebook™, FourSquare™, Instagram™, Tumblr™, LinkedIn™, etc.). In some aspects, system 140 may be a distributed system that may include computing components distributed across one or more networks, such as network 120, or other networks.

In some aspects, social networking system 160 may include computing components configured to store, maintain, and generate data and software instructions. For example, social networking system 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In one aspect, social networking system 160 may be configured to maintain one or more social networks having members (e.g., individuals and entities) linked together through one or more member-established relationships. By way of example, user 110 may be a user of a social media network (e.g., Twitter™, Facebook™, etc.), and social networking system 160 may be configured to establish an application programming interface (API) through which social networking system 160 may receive social media data and messages (e.g., tweets, retweets, direct messages, shared timeline postings, member profile information, query results, etc.) from member devices (e.g., client device 104), and through which social networking system 160 may broadcast social media data and messages (e.g., social media feeds) to member devices at regular intervals or in response to polling requests received from the member devices (e.g., as generated by a mobile app associated with social media network and executed by client device 104, such as a mobile Twitter™ app and/or a mobile Facebook™ app). In certain instances, client device 104 may be connected to social networking system 160 across network 120, may be configured to transmit and receive social data and messages in formats consistent with the social and/or microblogging network maintained by social networking system 160, and further, to present the received social media data through a web page or graphical user interface (GUI) associated with the social network (e.g., the mobile Twitter™ and/or Facebook™ app).

In other aspects, computing devices associated with various business entities may access the API, and may monitor or "listen" to the social media feeds broadcasted by social networking system 160 in order to identify specific elements of the broadcasted social media feeds for subsequent processing and/or presentation to users. By way of example, the financial institution associated with system 140 may request access to a Twitter™ feed (e.g., which includes specific tweets, retweets, etc. associated with Twitter™ accounts of user 110 and/or other users) broadcast at regular intervals by social networking system 160 in order to implement the one or more of the exemplary automated, social-media-based order entry and execution processes outlined below.

For instance, upon authentication of system 140 and/or the financial institution (e.g., business entity 150), social networking system 160 may provide system 140 with information necessary to establish a connection with the social-media-feed API, and system 140 may be configured to receive the Twitter™ feed regularly broadcasted by social networking system 160 to member devices. The broadcasted feed may, in some instances, include social media data and messages associated with all members having publicly available Twitter™ accounts, and as described below, system 140 may be configured to filter the received data feed to identify messages conforming to one or more criteria established by the financial institution, which include, but are not limited to, message type (e.g., tweet or retweet), message content (e.g., inclusion of specific Twitter™ hashtags, keywords, and other alpha-numeric character strings), and message format.

In other instances, upon establishment of the connection with the social-media-feed API, system 140 may be configured to receive a social media feed associated with any additional or alternate provider of social media and/or social networks (e.g., Facebook™, FourSquare™, Instagram™, Tumblr™, LinkedIn™, etc.), which social networking system 160 may broadcast regularly to member devices. For example, system 140 may receive, through the social-media-feed API, a regularly broadcast Facebook™ feed that includes, but is not limited to, social media data and messages associated with all members having publicly available Facebook™ accounts (e.g., specific timeline postings, comments on posted messages, direct messages, etc.). In certain aspects, as described below, system 140 may be configured to filter the received data feed to identify social media data conforming to one or more criteria established by the financial institution, which include, but are not limited to, data type (e.g., timeline posting, comments, direct message), content (e.g., inclusion of specific hashtags, keywords, or other alphanumeric character strings), and format. In certain embodiments, and based on the accessed Facebook™ feed and/or other social media feed, system 140 may implement any of the exemplary automated, social-media-based trade-order entry and execution processes outlined below. Although computing environment 100 is illustrated in FIG. 1 with client device 104 in communication with systems 140 and 160, persons of ordinary skill in the art will recognize that environment 100 may include any number of mobile or stationary client devices 104, and any additional number of computers, systems, or servers without departing from the spirit or scope of the disclosed embodiments. Further, although computing environment 100 is illustrated in FIG. 1 with a single business entity 150 and/or system 140, and a single social networking provider 170 and/or social networking system 160, persons of ordinary skill in the art will recognize that environment 100 may include any number of additional number of business entities, social networking providers, and corresponding systems, any number of additional servers and data repositories e.g., cloud-based data repositories), and any additional number of computers, systems, servers, or server farms without departing from the spirit or scope of the disclosed embodiments.

e. Exemplary Communications Networks

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

II. Exemplary Processes for Generating and Populating Trade Orders Based on Social Network Data In some aspects, as described above, client device 104 may execute one or more stored applications that enable user 110 to interact with one or more social networks. For example, user 110 may establish a Twitter™ account, a Facebook™ account, or an account associated with any additional or alternate social network to follow not only friends and family, but also news providers (e.g., the Wall Street Journal™) and various business entities of interest to user 110. In some instances, user 110 may also hold an investment portfolio composed of stocks, bonds, and other securities (e.g., derivatives, etc.) associated with or issued by one or more of the followed business entities. By way of example, user 110's investment portfolio may include common stock issued by Microsoft™, and user 110 may also follow one or more Twitter™ and Facebook™ accounts established by Microsoft™ (e.g., Microsoft™ (@Microsoft™) and Microsoft News™ (@MSFTNews™), in order to obtain real-time information that impacts the performance of Microsoft™ common stock.

Figure 2A:
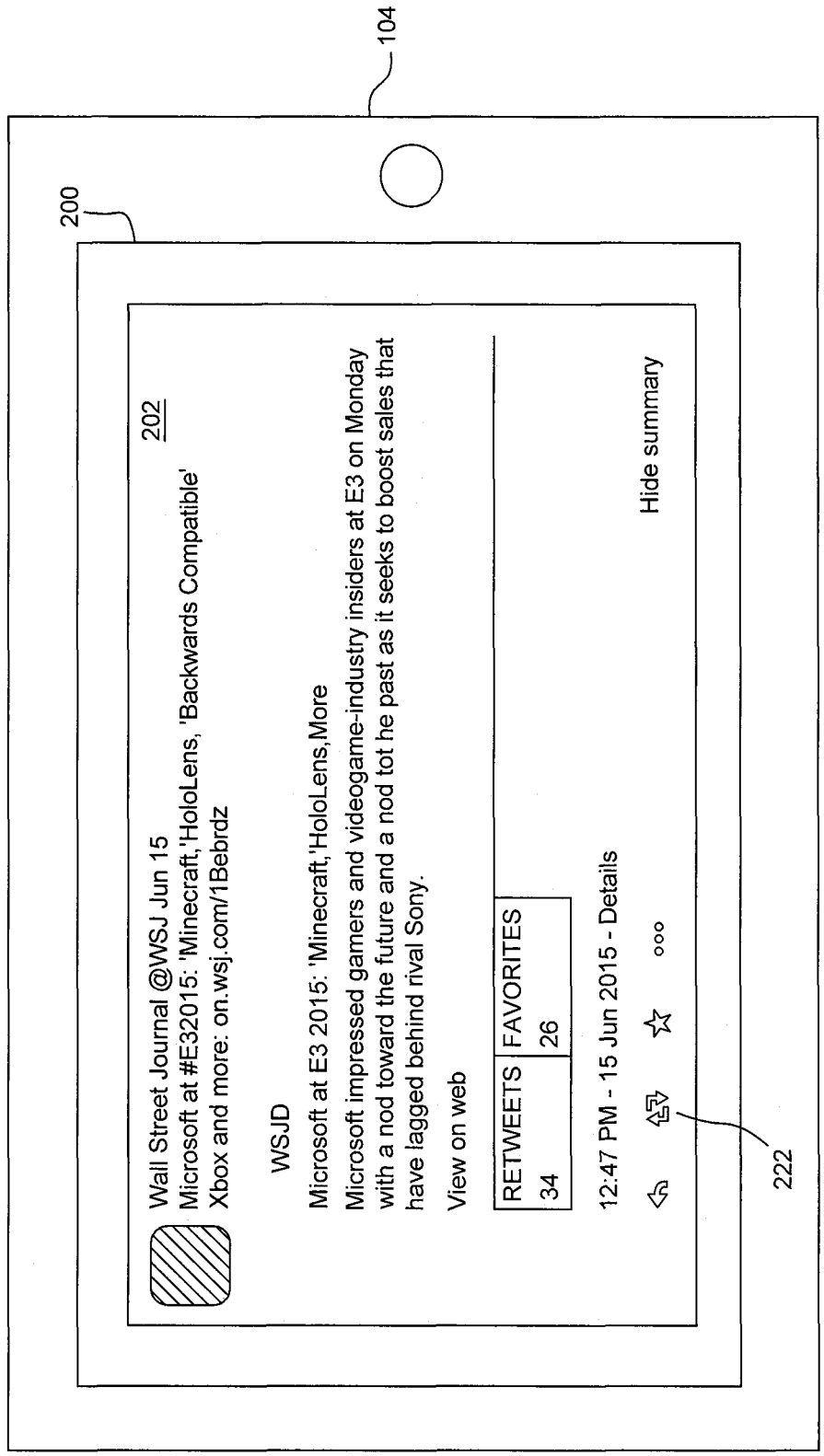
FIGS. 2A, 2B, 2C, 2D, and 2E are diagrams of exemplary social media messages, consistent with disclosed embodiments.

As illustrated in FIG. 2A, while browsing through tweets presented by client device 104 through a social media interface 200 (e.g., a GUI associated with the mobile Twitter™ app), user 110 may notice a tweet 202 from the Wall Street Journal™ (@WSJ™) related to a presentation of Microsoft™'s latest updates to their gaming platform. User 110 may select tweet 202 (e.g., by touching, tapping, or otherwise selecting the presented tweet within the GUI), and may view additional information 212 indicating that Microsoft™'s new entries into the gaming market seek to boost sales and overcome rivals. Based on additional information 212, user 110 may decide to purchase additional shares of Microsoft™ common stock in anticipation of a potential bump in share price due to Microsoft™'s updated gaming system.

Figure 2B:
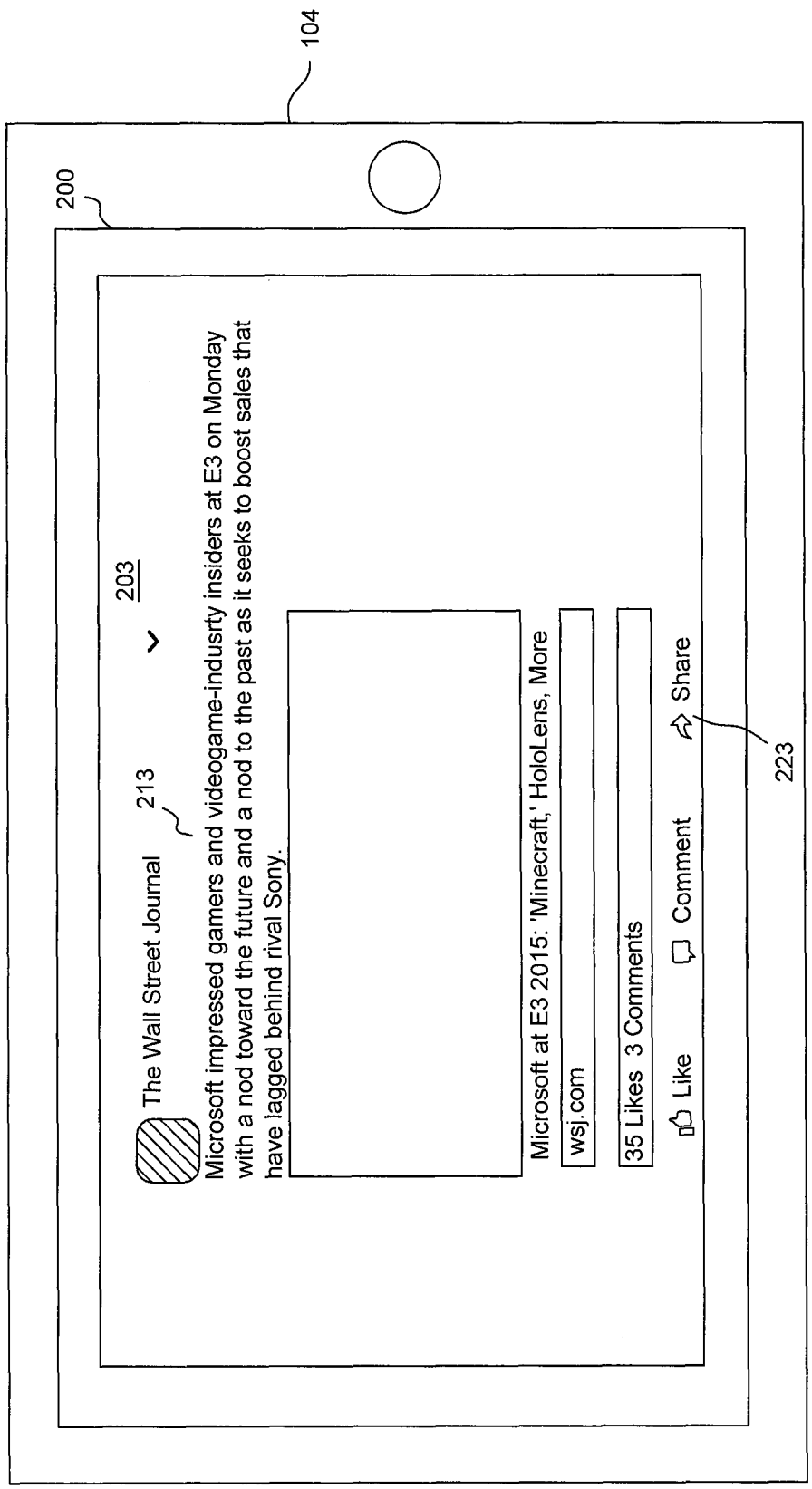

In other instances, user 101 may determine to purchase the additional shares of Microsoft™ common stock based on digital content shared within one or more additional or alternate social networks, such as Facebook™, FourSquare™, Instagram™, Tumblr™, LinkedIn™, etc. For example, user 110 may follow a Facebook™ account maintained by the Wall Street Journal™ (@wsj™) and as illustrated in FIG. 2B, user 101 may view a posting 203 related to the presentation of Microsoft™'s latest updates to their gaming platform. As described above, user 110 may select posting 203 (e.g., by touching, tapping, or otherwise selecting the presented posting within the GUI), and may view additional information 213 indicating that Microsoft™'s new entries into the gaming market seek to boost sales and overcome rivals. Based on additional information 213, and any additional or alternate information provided by other social networking providers, user 110 may decide to purchase additional shares of Microsoft™ common stock in anticipation of a potential bump in the share price.

a. Conventional Trade-Order Entry and Generation Processes

To purchase the additional shares of Microsoft™ using conventional and existing trade-order entry and generation processes, user 110 must close the GUI associated with the mobile Twitter™ or Facebook™ app, and must access a web page or other GUI associated with user 110's financial institution (e.g., business entity 150). Upon accessing the web page of other GUI, user 110 provides authentication information into client device 104, and in response to verification from system 140, client device 104 may present a trade-order interface that enables user 110 to specify parameters required to complete the purchase of the shares of Microsoft™ common stock. System 140 may receive the specified trade parameters from client device 104, and may transmit a trade order based on the specified trade parameters to an electronic trading system of the financial institution, which executes the purchase of the Microsoft™ common stock in accordance with the specified trade parameters and rules and regulations of the financial institution and a corresponding exchange.

Thus, to purchase the desired shares of Microsoft™ common stock via conventional and/or existing trade-order entry and generation processes, user 110 exits the mobile Twitter™ or Facebook™ app on client device 104, and accesses a digital trading portal provided by user 110's financial institution (e.g., through a web page or GUI presented by client device 104), and further, manually inputs the trade parameters into the digital banking portal to initiate the purchase of the desired shares of Microsoft™ common stock. This process is cumbersome and time-consuming, especially when performed on mobile devices with touchscreen displays of limited size and variable connectivity to network 120. Furthermore, due to rapidly changing market conditions, the time required to switch applications and manually input the desired trade parameters may impact user 110's ability to purchase the Microsoft™ common stock at the desired share price. Thus, there is a need for improved systems and methods that not only speed the entry of trade parameters into corresponding trade-order interfaces, but that also closely integrate the entry process with sources of market information, such as social media.

b. Exemplary Processes that Automate Trade-Order Entry based on Social-Network Interaction The disclosed embodiments address these and other problems associated with conventional trade-order entry and generation processes in a technical manner, by providing computer-implemented systems and methods that automate an entry of a trade order on behalf of a customer, and additionally or alternatively, that automate an execution of the entered trade order, based on the customer's interaction with one or more social networks (e.g., Twitter™, Facebook™, FourSquare™, LinkedIn™, etc.). For example, a customer (e.g., user 110) may access an account on a social network (e.g., a Twitter™ or Facebook™ account) through a web page or a graphical user interface (GUI) presented by client device 104. User 110 may identify a social media message (e.g., a "tweet" or timeline posting) involving a particular company or business entity of interest, and user 110 may desire to execute a transaction to purchase or sell securities associated with the particular company or business entity.

User 110 may, for example, provide input to client device 104 that forwards the identified social media message to system 140 through the social network (e.g., by "retweeting" the identified tweet or sharing the identified timeline posting) along with trade parameters and predetermined content indicative of user 110's interest in a purchase of or sale of the securities (e.g., a hashtag or other specific content parseable by system 140). In certain aspects, described below in reference to FIG. 3, system 140 may monitor a data feed associated with the social network (e.g., data broadcast by social networking system 160 through a corresponding API) to identify the forwarded message, and may process the forwarded message to automatically populate a trade order for the desired purchase or sale of securities, which may be executed automatically or upon receipt of confirmation from user 110.

In one aspect, and as described above in reference to FIG. 2A, user 110 may be associated with a corresponding Twitter™ account, and may view tweet 202 (e.g., as presented by client device 104 within social media interface 200) indicating that Microsoft™'s new entries into the gaming market seek to boost sales and overcome rivals. User 110's investment portfolio may already include Microsoft™ common stock, and based on the information in tweet 202, user 110 may decide to purchase an additional 100 shares of Microsoft™ common stock. In some aspects, and consistent with the disclosed embodiments, user 110 may elect to "retweet" tweet 202 to the financial institution with comments indicating user 110's desire to purchase the Microsoft™ common stock in accordance with one or more specified trade parameters.

For example, user 110 may select icon 222 in FIG. 2A (e.g., by touching or tapping a portion of a touchscreen display corresponding to icon 222) in order to access a retweet interface 240, which client device 104 may present to user 110. In some aspects, user 110's financial institution may establish specific content to be included within forwarded social media messages to indicate, to system 140, that the forwarded social media message includes a request to generate a proposed trade order. For example, within Twitter™, the financial institution may require that user 110 include "#Trade" within a tweet, retweet, or direct message to the financial institution that represents a request to generate a proposed trade order. The disclosed embodiments are, however, not limited to any particular hashtag, and in other embodiments, the financial institution may specify the inclusion of any additional or alternate alpha-numeric string apparent to one of skill in the art that enables system 140 to identify the corresponding tweet, retweet, or direct message within the broadcast Twitter™ feed. Furthermore, the disclosed embodiments are not limited to social media messages generated and forwarded within the Twitter™ network, and in other aspects, the financial institution and/or system 140 may assign additional content that identifies requests to generate proposed trading orders included within social media messages forwarded to the financial institution other social networks (e.g., Facebook™, FourSquare™, LinkedIn™, etc.).

Figure 2C:
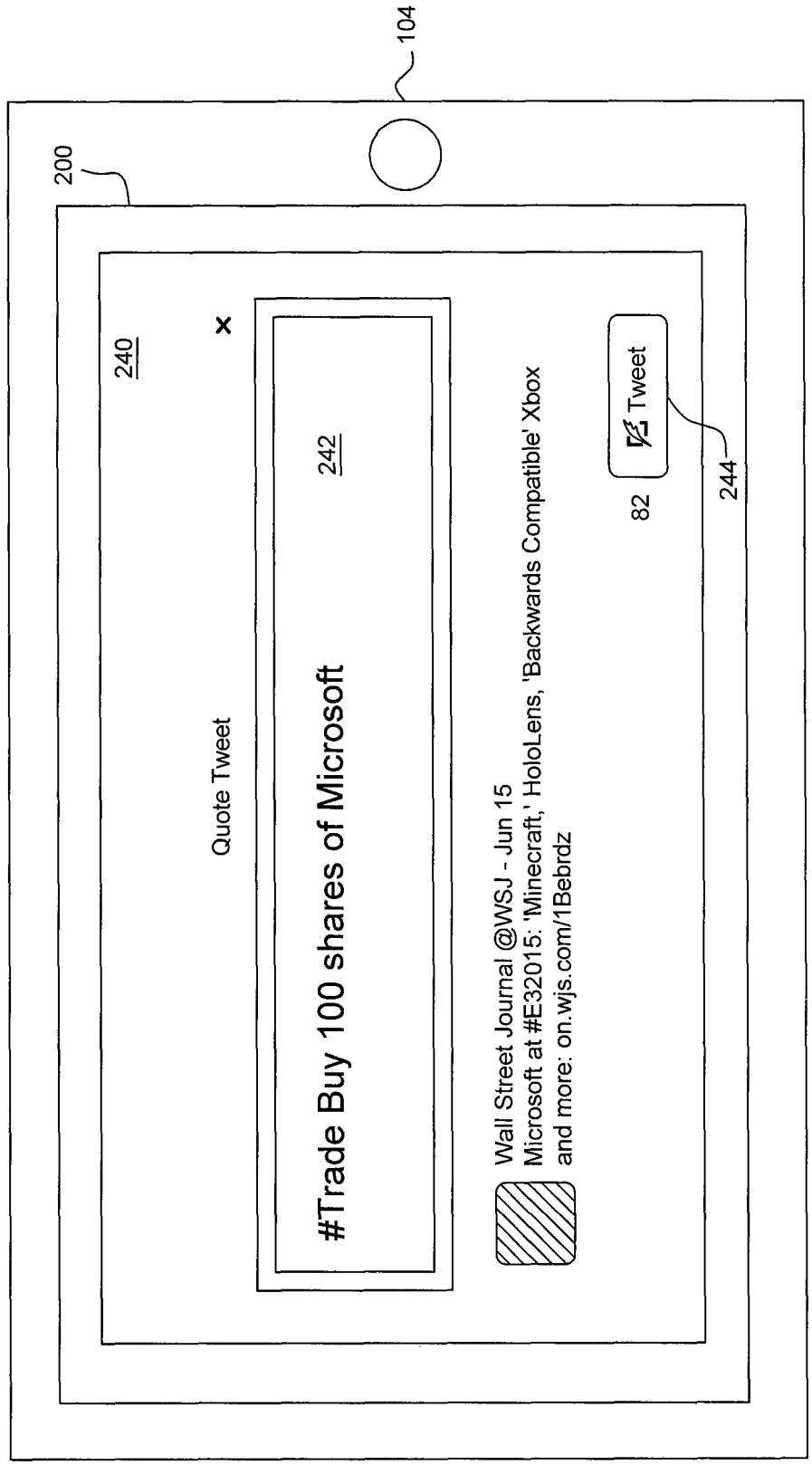

By way of example, and as noted above, user 110 may desire to purchase 100 shares of Microsoft™ common stock after viewing the tweet 202. Referring to FIG. 2C, user 110 may provide input to client device 104 (e.g., through a virtual keypad, spoken commands, etc.) that includes "#Trade" within comment region 242 of retweet interface 240, and further, that specifies an instruction to "Buy 100 shares of Microsoft." In some aspects, user 110 may select icon 244 (e.g., by touching or tapping a portion of a touchscreen display corresponding to icon 244) to retweet the tweet 202 to the financial institution (e.g., via "#Trade") with the user-specified instructions to purchase 100 shares of Microsoft™ common stock. In response to user 110's selection of icon 244, client device 104 may generate retweet data that includes the specified hashtag (i.e., "#Trade"), the instructions to purchase the 100 shares of Microsoft™ common stock (i.e., "Buy 100 shares of Microsoft"), which may be transmitted to social networking system 160 across network 120 using any of the communications protocols outlined above. Social networking system 160 may, in some aspects, be configured to receive the retweet data transmitted by client device 104 and include the retweet data in a corresponding Twitter™ data stream, which may be broadcast to member devices and other subscribing systems at regular intervals through the corresponding Twitter™ API.

In other aspects, and as described above in reference to FIG. 2B, user 110 may be associated with a corresponding Facebook account, and may view timeline posting 203 (e.g., as presented by client device 104 within social media interface 200) indicating that Microsoft™'s new entries into the gaming market seek to boost sales and overcome rivals, and based on additional information 213, user 110 may decide to purchase an additional 100 shares of Microsoft™ common stock. In some aspects, and consistent with the disclosed embodiments, user 110 may elect to share posting 203 to the financial institution with comments indicating user 110's desire to purchase the Microsoft™ common stock in accordance with one or more specified trade parameters.

For instance, user 110 may select icon 223 in FIG. 2B (e.g., by touching or tapping a portion of a touchscreen display corresponding to icon 223) in order to access an interface that enables user 101 to "share" posting 203 with the financial institution. In some aspects, the financial institution may establish specific content to be included within forwarded social media messages to indicate, to system 140, that the forwarded social media message includes a request to generate a proposed trade order, and additionally or alternatively, the financial institution may specify a particular social-media handle or username for shared social media messages that request the generation of proposed trade orders. For example, within Facebook™, the financial institution may require that user 110 include a particular character string, such as "#Trade," within a shared porting, comment, or direct message that represents a request to generate a proposed trade order. In other instances, the financial institution may require that any shared posting or direct message be associated with or transmitted to a specified Facebook™ username, such as "@FITrade." In other aspects, the shared posting may not be associated with the particular social-media handle or username, and may instead be posted to user 101's Facebook™ timeline and shared with any additional or alternate Facebook™ users capable of accessing user 101's timeline (e.g., users linked to user 101 within Facebook™, Facebook™ users capable of publicly accessing user 101's timeline, etc.).

Figure 2D:
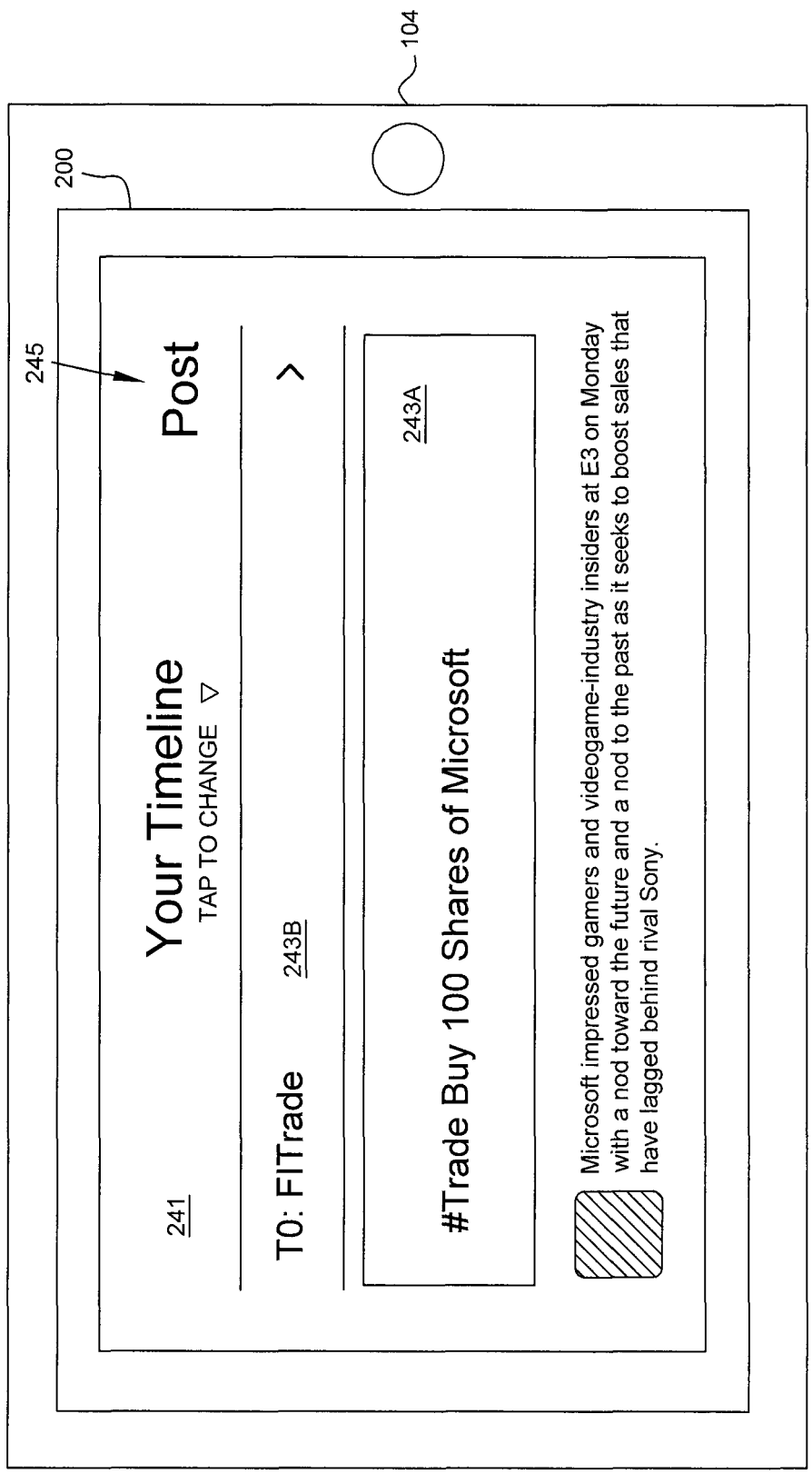

By way of example, and as noted above, user 110 may desire to purchase 100 shares of Microsoft™ common stock after viewing timeline posting 203, and may select icon 223 to access an interface facilitating the sharing of timeline posting 203. Referring to FIG. 2D, user 110 may provide input to client device 104 (e.g., through a virtual keypad, spoken commands, etc.) that includes "#Trade" within comment region 243A of interface 241, and further, that specifies an instruction to "Buy 100 shares of Microsoft." Further, and as described above, user 110 may also provide input to client device 104 that specifies the financial institution as the recipient of the shared posting within destination region 243B of interface 241. In some aspects, user 110 may select icon 245 (e.g., by touching or tapping a portion of a touchscreen display corresponding to icon 245) to share posting 203 with the financial institution and provide to the financial instruction the user-specified instructions to purchase 100 shares of Microsoft™ common stock.

In response to user 110's selection of icon 245, client device 104 may generate message data that includes the specified character string and the user-specified instructions, which may be transmitted to social networking system 160 across network 120 using any of the communications protocols outlined above. As described above, social networking system 160 may receive the message data transmitted by client device 104, and include the message data in a corresponding Facebook™ data stream, which may be broadcast to member devices and other subscribing systems at regular intervals through the corresponding Facebook™ API.

Figure 3:
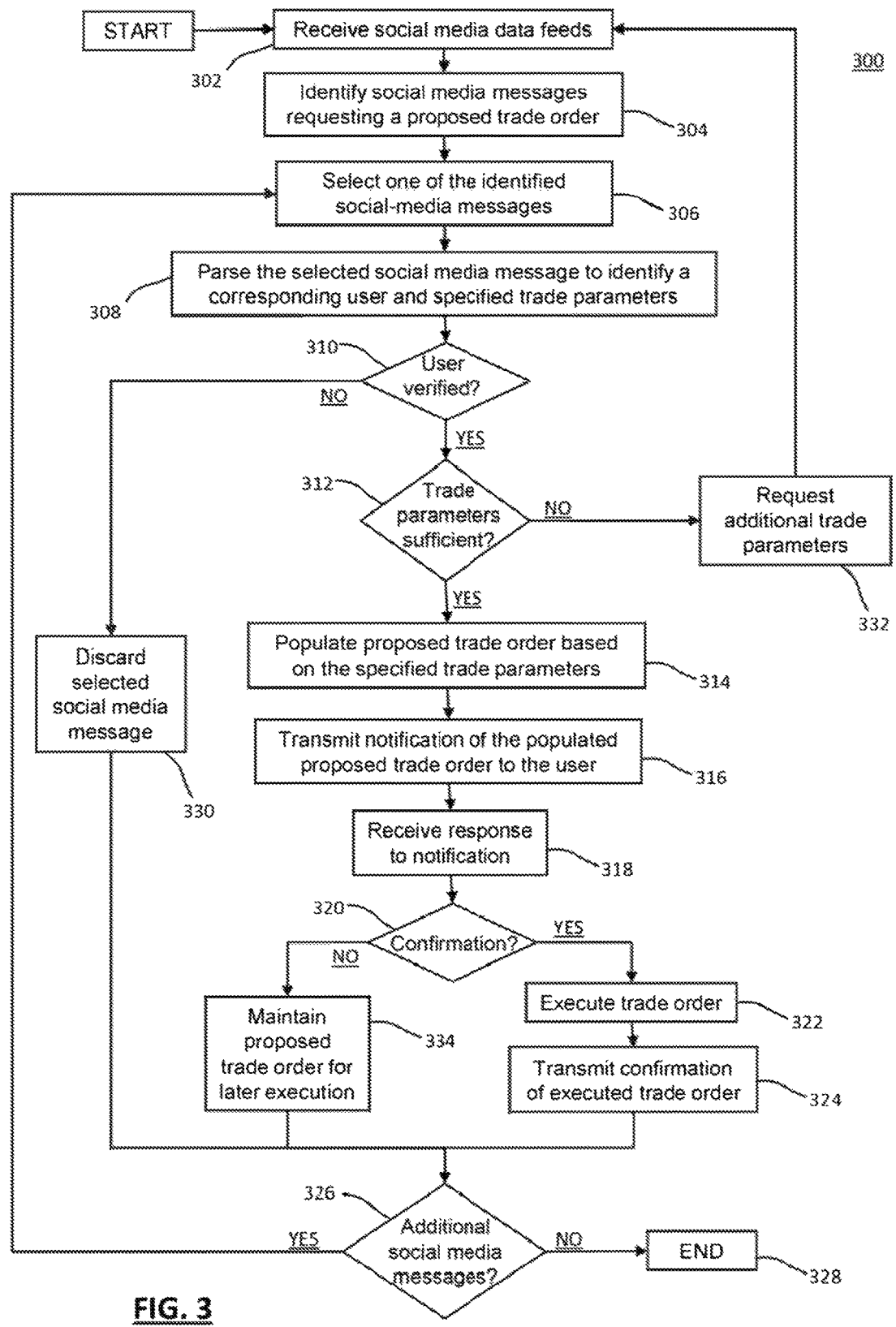
FIG. 3 is a flowchart of an exemplary process for generating orders based on social media data, consistent with disclosed embodiments.

The disclosed embodiments are, however, not limited to processes that request trade orders based on shared Facebook™ postings. In other instances, user 110 may include the specified character string (e.g., "#Trade") and the trade parameters within a comment on posting 203 (e.g., within a comment interface presented by client device 104), and additionally or alternatively, within a direct message to the financial institution (e.g., within a Messenger™ interface presented by client device 104). In further embodiments, user 101 may provide trade parameters and corresponding character strings to interfaces generated by mobile applications associated with any additional or alternate provider of a social network, such as Instagram™, Snapchat™, FourSquare™, LinkedIn™, etc.

c. Flow Diagrams and Further Examples of Exemplary Processes for Generating Trade Orders based on Social Media Data FIG. 3 is a flowchart of an exemplary process 300 for automatically generating trade orders based on social media data, in accordance with disclosed embodiments. In an embodiment, a user (e.g., user 110) may access a social network though a device (e.g., client device 104), and may provide input to client device 104 that forwards a social media message related to a particular company or business entity to financial institution through the social network, along with information identifying one or more trade parameters and content indicating the user 110's desire to initiate a transaction to purchase or sell securities associated with the particular company or business entity. A system associated with the financial institution (e.g., system 140) may monitor social media data broadcasted by a system associated with the social network (e.g., social networking system 160), and may identify the forwarded social media message based on the included content (e.g., a hashtag or other pre-established identifier). System 140 may be configured to parse the forwarded social media message to create a proposed trade order for the purchase or sale of the securities, and may be configured to forward a confirmation request to user 110 that includes the proposed trade order over the social network. Upon receipt of the confirmation from user 110 (e.g., through an additional social media message forwarded to the financial institution through the social network), system 140 may be configured to execute a transaction to purchase or sell the securities based on the proposed trade order, or alternatively, to generate a trade order based on the proposed trade order for subsequent review, approval, and execution by user 110.

Referring to FIG. 3, system 140 may be configured to receive social media data feeds (e.g., Twitter™, Facebook™, or other social media data feeds) broadcast by social networking system 160 (e.g., in step 302), and further, identify one or more social media messages (e.g., Twitter™ retweets, tweets, and/or direct messages, Facebook™ postings, comments, and/or direct messages, etc.) that include the specific content tags indicative of requests to generate proposed trade orders (e.g., in step 304). For example, and as described above, system 140 may subscribe to Twitter™ data feeds broadcast to member devices and other subscribing systems at regular intervals through the corresponding Twitter™ API. The Twitter™ data feeds, which may be received by system 140 in step 302, may include tweets, retweets, and/or direct messages generated by and directed to various Twitter™ accounts holders, such as individuals and business entities.

In certain aspects, system 140 may, in step 304, process the received Twitter™ data to identify social media messages (e.g., tweets, retweets, etc.) that include the "#Trade" hashtag indicative of requests for generate proposed trading orders, and the identified messages may be stored for future analysis (e.g., in a portion of data repository 144). Each of the identified social media messages may, for example, be associated with a corresponding timestamp indicative of a time and date at which corresponding Twitter™ account holders transmitted the social media messages to the financial institution. In some aspects, system 140 may be configured to parse the social media messages to determine the corresponding timestamp, and system 140 may queue the social media messages for subsequent analysis in accordance with the determined timestamps.

The disclosed embodiments are, however, not limited to techniques that identify social media messages within the Twitter™ data based on a presence of one or more alphanumeric or character strings associated with requests for generating proposed trading orders. In further embodiments, system 140 may identify social media messages representative of requests to generate proposed trading orders based on a format of the social media messages (e.g., the financial institution may specify that a social media message requesting a proposed trade order be formatted in a particular manner). In other aspects, system 140 may access a list of customers of the financial institution (e.g., customers who elected to participate in automated, social-media-based trade order entry and execution processes), and may identify social media messages originating from accessed customer list for subsequent analysis in step 304.

Additionally, the disclosed embodiments are not limited to techniques that identify Twitter™ data, such as tweets or retweets, that represent requests to generate proposed trade orders. In further embodiments, as described above, system 140 may identify social media messages representative of requests to generate proposed trade orders within received Facebook™ data (e.g., postings, comments, direct messages, etc.) and/or within received data associated with any additional or alternate social network (e.g., Instagram™, Snapchat™, FourSquare™, LinkedIn™, etc.).

System 140 may be configured to select one of the identified social media messages for analysis (e.g., in step 306). For example, system 140 may select the social media message disposed at an initial position within the queue and thus, associated with the earliest timestamp. The disclosed embodiments are not limited to these exemplary selection criteria, and in other embodiments, system 140 may select one of the stored social media messages for analysis based on any additional or alternate criterion apparent to one of skill in the art and appropriate to the social media messages, such as a user associated with the message.

In some aspects, system 140 may be configured to parse the selected social media message to identify a user associated with the message (e.g., a Twitter™ handle associated with user 110 and included within the selected social media message) and further, to identify one or more trade parameters specified within the body of the selected social media message (e.g., in step 308). In certain aspects, trade parameters consistent with the disclosed embodiments may include, but are not limited to: an identifier of a security (e.g., a name or a symbol); a type of transaction involving the security (e.g., a transaction to purchase and/or sell units of the security, adding the security to or removing the security from a virtual investment portfolio, and/or adding the security to or removing the security from a watchlist); a quantity of the security involved in the transaction, a price type for the transaction (e.g., a best price available on a market, a specified price to buy or sell the security, and/or an instruction to system 140 to transmit a corresponding trade order to the market (e.g., at the best or specified price) only after the security has traded through a user-specified threshold (e.g., stop orders, trailing stop orders, etc.); information specifying whether a corresponding trade order should be sent to a market for execution after an occurrence of a triggering event (e.g., conditional and/or contingent orders); a period of validity for a corresponding trade order; and other special instructions that are used by certain exchanges or marketplaces that dictate either the treatment of a corresponding trade order (e.g., all-or-none orders, etc.) and/or a relationship between user 110 and the security (e.g., insider status).

Further, in additional aspects, the selected social media message may include information specifying one or more accounts and/or account types that provide funds facilitate an execution of proposed trade order (e.g. to purchase securities) and/or that receive funds from an executed trade order (e.g., to sell securities). For example, and using any of the exemplary techniques described above, user 110 may provide input to client device 104 that specifies an account and/or account type within comment region 242 (e.g., an account name, or a specific hashtag (such as #AcctUSMargin or #AcctCADRRSP) mapped by user 110 to a corresponding account during a registration process), which system 140 may store in a portion of data repository 144.

For example, as described above in reference to FIGS. 2A and 2C, user 110 may have retweeted a prior tweet that included comments (e.g., within region 242) requesting a purchase of 100 shares of Microsoft™ common stock. System 140 may, in certain aspects, process the retweet in step 308 to identify a Twitter™ handle associated with user 110 (e.g., "@user110") and to determine that user 110 requested a proposed trade order for a purchase of 100 shares of Microsoft™ common stock at a current market price.

The disclosed embodiments are, however, not limited to processes that parse user-specified comments associated with a retweet or other social media message. In other embodiments, system 140 may be configured to parse not only comment data entered by user 110, but also other textual and/or graphical portions of the retweet or other social media message to extract trade parameters (and additionally or alternatively, parameters of other transactions or actions involving one or more securities).

For instance, as illustrated in FIG. 2A, user 110 may view (e.g., through a web page or GUI presented by client device 104) tweet 202 from the Wall Street Journal™ (@WSJ™) related to a presentation of Microsoft™'s latest updates to their gaming platform. In some aspects. As described above, user 110 may elect to purchase additional shares of Microsoft™ common stock, and may thus "retweet" tweet 202 to system 140 through the social network along with trade parameters and predetermined content indicative of user 110's interest in a purchase of or sale of the securities (e.g., a hashtag or other specific content parseable by system 140). By way of example, as depicted in FIG. 2C, user 110 may provide input to client device 104 that includes "#Trade" within comment region 242 of retweet interface 240, and further, that specifies an instruction to "Buy 100."

Figure 2E:
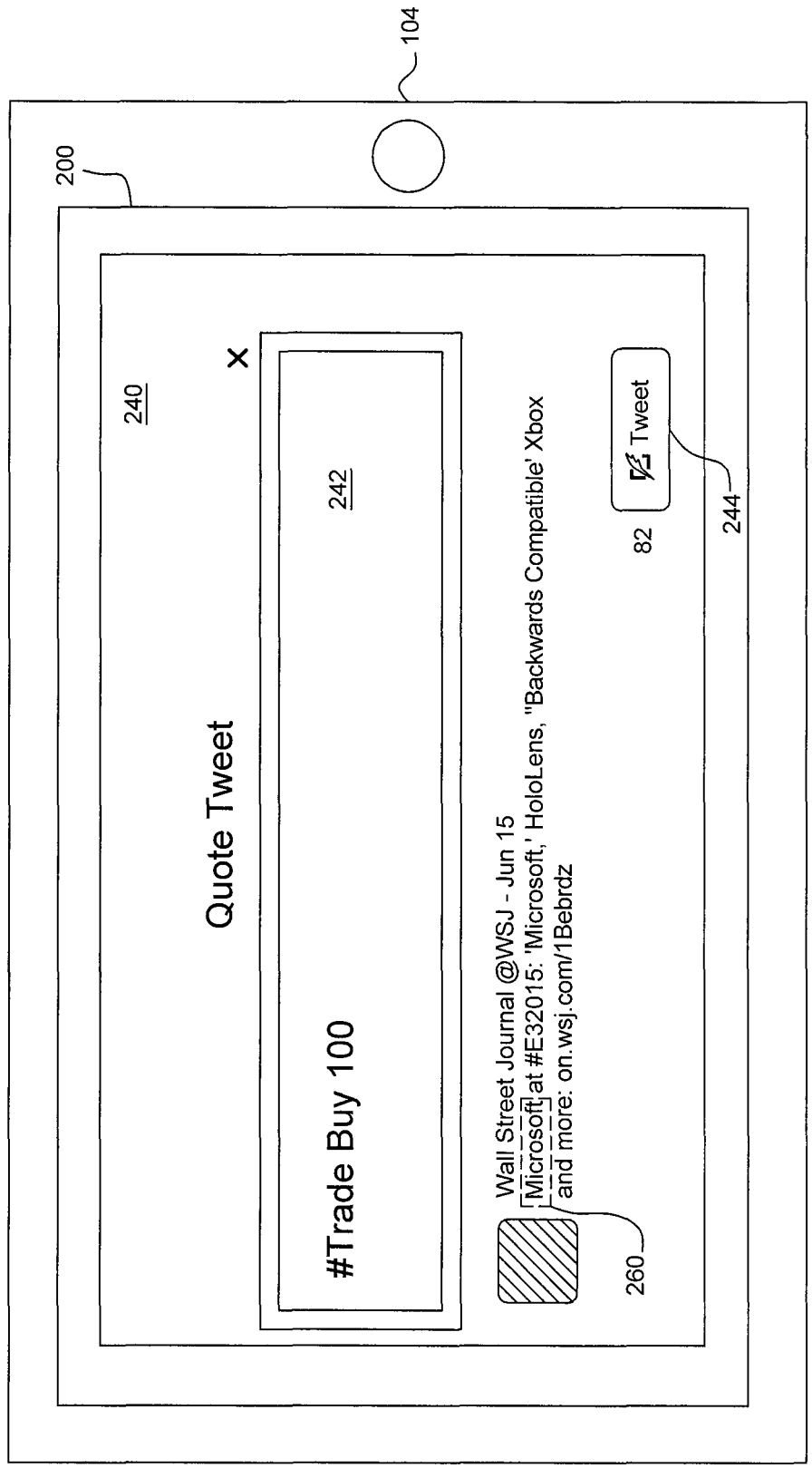

In some aspects, system 140 may identify and select the retweet as a social media message requesting a proposed trade order (e.g., in steps 304 and 306), and may parse the retweet to extract one or more parameters of the proposed trade order (e.g., in step 308). For example, in step 308, system 140 may parse the retweet to identify a Twitter™ handle associated with user 110 (e.g., "@user110") and to determine a type of transaction (e.g., a purchase) and a share quantity (e.g., 100 shares) associated with the proposed trade order. As described above, user 110 may specify these determined trade parameters by providing input to client device 104 for inclusion within comment region 242 (e.g., as illustrated in FIGS. 2C and 2E).

In further aspects, in step 308, system 140 may parse additional portions of the retweet to identify additional parameters of the proposed trade order. For example, system 140 may parse textual content within the retweet to identify a name and/or symbol of a security (e.g., textual content 260 of FIG. 2E identifying Microsoft™) for the proposed trade order. In other instances, in step 308, system 140 may be configured to apply one or more optical character recognition (OCR) processes to graphical and/or video content within the retweet (or other selected social media message) to identify additional or alternate parameters of the proposed trade order. In further aspects, user 110 may provide input causing client device 104 to capture an image of a UPC code, QR code, and/or other two-dimensional code, which may be included within the retweet or other social media message, and further, which may be parsed by system 140 to identify a corresponding identifier of one or more securities for inclusion within the proposed trade order. Further, and by way of example, system 140 may process audio content within the retweet (or other selected social media message) in step 308 to identify additional or alternate parameters of the proposed trade order.

In further aspects, system 140 may parse the selected social media message (e.g., the retweet of prior tweet 202, shared posting 203, etc.) to identify common words that may be representative of values of one or more trade parameters. For instance, system 140 may parse the selected social media message to identify a presence of "long" or "short," and may further associate the presence of "long" or "short" with a transaction to purchase or sell securities. In other instances, and as described above, system 140 may parse a retweet to identify a company name (e.g., Apple™) and/or a name of a popular product or service (e.g., iPhone™), and based on the identified company, product, and/or service name, device a corresponding symbol for a security associated with the proposed trade order (e.g., AAPL for shares of Apple™ common stock).

In further aspects, system 140 may parse the selected social media message to identify specific words or combination of words (e.g., $20 for a limit price, a day-for-a-day order, 100 for the quantity, buy/sell, etc.) to populate the transaction fields of the proposed trade order. Additionally or alternatively, system 140 may parse the selected social media message to identify one or more hashtags (e.g., #Trade, #Watch, #Virtual, etc.), which system 140 may associated with corresponding actions and/or transactions involving one or more securities (e.g., transactions to purchase and/or sell securities, adding securities to a watchlist, adding securities to a virtual investment portfolio, etc.).

Additionally, and as described herein, system 140 may substitute default values for one or more trade parameters (e.g., as established by user 110, system 140, a financial institution, and/or business entity 150), and incorporate the substitute default values into the proposed trade order. For example, if upon parsing the selected social media message or retweet, system 140 were unable to identify a price type for the transaction, system 140 may establish the price type as the best market price. Additionally or alternatively, if system 140 were unable to identify an expiration of the proposed trade order and/or account data, system 140 may substitute corresponding default values (e.g., a "good ctil day" order for the expiration, a favorite account for the account data, etc.) within the proposed trade order.

Upon parsing the selected social media message, system 140 may verify that user 110 is a customer of the financial institution and further, that user 110 elected to participate in automated, social-media-based trade order entry and execution processes (e.g., in step 310). In some aspects, system 140 may access profile data associated with one or more customers of the financial institution (e.g., as stored in data repository 144, above), and may compare the identified Twitter™ handle, Facebook™ username, or other social media credential against the accessed customer profile data to verify that user 110 is a customer of the financial institution. System 140 may also determine, based on accessed profile data, whether user 110 elected to participate in automated, social-media-based trade order entry and execution processes For example, system 140 may determine that "@user110" corresponds to a Twitter™ handle registered by a customer of the financial institution and further, that the customer of the financial institution elected to participate in automated, social-media-based trade order entry and execution processes. Accordingly, as the mobile Twitter™ application executed by client device 104 previously authenticated user 110, system 140 may determine that user 110 is verified in step 310.

Further, in other instances, system 140 may determine, based on the accessed customer profile data, that the Twitter™ handle "@user110" is not registered by any customers of the financial institution. Alternatively, system 140 may determine that "@user110" corresponds to a Twitter™ handle registered by a customer of the financial institution, but the customer did not elect participate in automated, social-media-based trade order entry and execution processes. Accordingly, system 140 may not verify user 110 in step 310.

If system 140 were to verify that user 110 is a customer of the financial institution and that user 110 elected to participate in the automated, social-media-based trade order entry and execution processes (e.g., step 310; YES), system 140 may determine whether the specified trade parameters are sufficient to populate a proposed trade order (e.g., in step 312). By way of example, in step 312, system 140 may deem the specified trade parameters as sufficient to populate the proposed trade order when the specified trade parameters include values of an "essential" number of trade parameters, and additionally or alternatively, when system 140 may assign default and/or previously specified values to at least the essential trade parameters.

In one aspect, system 140 may populate a proposed trade order with values of a number of trade parameters extracted from the selected social media message (e.g., a retweet, etc,). In some instances, and as described above, trade parameters consistent with the disclosed embodiments may include, but are not limited to, an identifier of a security (e.g., a name or a symbol), a quantity of units of the security, a type of transaction associated with the proposed trade order (e.g., a purchase or a sale of the security), a price type associated with the transaction, an execution time for the transaction, a floor and/or ceiling price for individual units of the security or for the transaction, information specifying whether a trade order should be sent to a market for execution after an occurrence of a triggering event, a period of validity for a trade order, and/or other special instructions that are used by certain exchanges or marketplaces that dictate either the treatment of a corresponding trade order and/or a relationship between user 110 and the security. Additionally or alternatively, and as outlined above, the extracted trade parameters may also include information specifying one or more accounts and/or account types that provide funds facilitate an execution of proposed trade order (e.g. that purchases securities) and/or that receive funds from an executed trade order (e.g., that sells securities).

In some aspects, as described above, however, the financial institution may establish that a subset of these trade parameters are essential to generating the proposed trade order, and that the non-essential trade parameters may be establish based on default values and/or values specified within a corresponding customer profile. By way of example, the financial institution and/or system 140 may establish that the name or symbol of the security, the quantity of the security, and the type of transaction (e.g., a purchase or a sale), and the price type associated with the transaction represent essential parameters that must be present within any request to populate a proposed trade order.

Further, in some instances, the financial institution may establish default values for non-essential trade parameters (e.g., the execution time (e.g., as soon as possible) and the floor/ceiling prices (e.g., none)). In other instances, the non-essential trade parameters may include, but are not limited to, an account and/or account types associated with the transaction, information specifying whether a corresponding trade order should be sent to a market for execution after an occurrence of a triggering event, a period of validity for a corresponding trade order, and/or other special instructions that are used by certain exchanges or marketplaces that dictate the treatment of a corresponding trade order and/or a relationship between user 110 and the security, for which system 140 may be configured to establish default values using any of the exemplary techniques described above. In some aspects, system 140 may be configured to populate the proposed trade order with the default values assigned to these non-essential terms unless the access customer profile data indicates an alternate value.

For instance, system 140 may determine that the selected social media message includes a request from user 110 to purchase 100 shares of Microsoft™ common stock. Further, based on stored data (e.g., in data repository 144) and/or data accessible to system 140 across network 120, system 140 may also be configured to determine that the NASDAQ™ symbol for Microsoft™ common stock is MSFT™. In some aspects, system 140 may establish that user 110's request for a proposed trade order specified the name or symbol of the security (e.g., MSFT™), the number of units of the security (e.g., 100 shares), and the type of transaction (e.g., a purchase). Accordingly, system 140 may establish that the trade parameters specified by user 110's request are sufficient to populate a proposed trade order.

If system 140 were to determine that the specified trade parameters include the essential trade parameters (e.g., step 312; YES), system 140 may be configured to generate the proposed trade order in accordance with the specified trade parameters (e.g., in step 314). For example, as described above, user 110's social media message requested a purchase of 100 shares of Microsoft™ common stock. In certain aspects, system 140 may populate the proposed trade order with the symbol of the requested security (e.g., MSFT™), the number of units of the security (e.g., 100 shares), and the type of transaction (e.g., a purchase). System 140 may also access user 110's customer profile data to determine whether user 110 previously specified (e.g., within the preferences described above) a desired price type (and additionally or alternatively, an execution time and a desired floor/ceiling) price that would override the default values previously established by the financial institution and/or system 140.

By way of example, system 140 may determine that user 110's customer profile data failed to specify a desired price type that would override an established default value (e.g., a best price available on a market). System 140 may, in certain aspects, further populate the proposed trade order for the purchase of Microsoft™ common stock with the default price type (e.g., the best price available). Further, for example, system 140 may determine that user 110's customer profile data specified neither a desired execution time nor a desired floor/ceiling price that would override the established default values. System 140 may, in certain aspects, further populate the proposed trade order for the purchase of Microsoft™ common stock with the default execution time (e.g., as soon as possible) and the default floor/ceiling prices (e.g., none).

Similarly, and as described above, user 110's social media message (e.g., the retweet of tweet 202 of FIG. 2A, shared posting 203 of FIG. 2B, etc.) may include predetermined content (e.g., a hash tag, such as #AcctUSMargin or #AcctCADRRSP) linked to corresponding account within stored user preference data (e.g., within data repository 144). In some aspects, system 140 may identify the predetermined content, access portions of the stored preference data mapping the predetermined content to a corresponding account (or accounts) of user 110, and populate the proposed trade order with the information identifying the corresponding account. In other instances, when user 110's social media message fails to include any account information, system 140 may populate the proposed trade order with a "favorite" account of user 110 (e.g., as specified by user 110 during a registration process and stored by system 140 within data repository 144), where proceeds of an executed trade order may be placed in an appropriate currency and/or that includes appropriate and sufficient funds to facilitate an execution of a trade order. The disclosed embodiments are, however, not limited to the exemplary essential trade parameters, exemplary non-essential trade parameters, and exemplary default values specified above. In further embodiments, the financial institution and/or system 140 may establish any additional or alternate essential trade parameters, non-essential trade parameters, and default values appropriate to the requested security and one or more back-end trading systems associated with the financial institution and accessible to system 140.

Figure 4A:
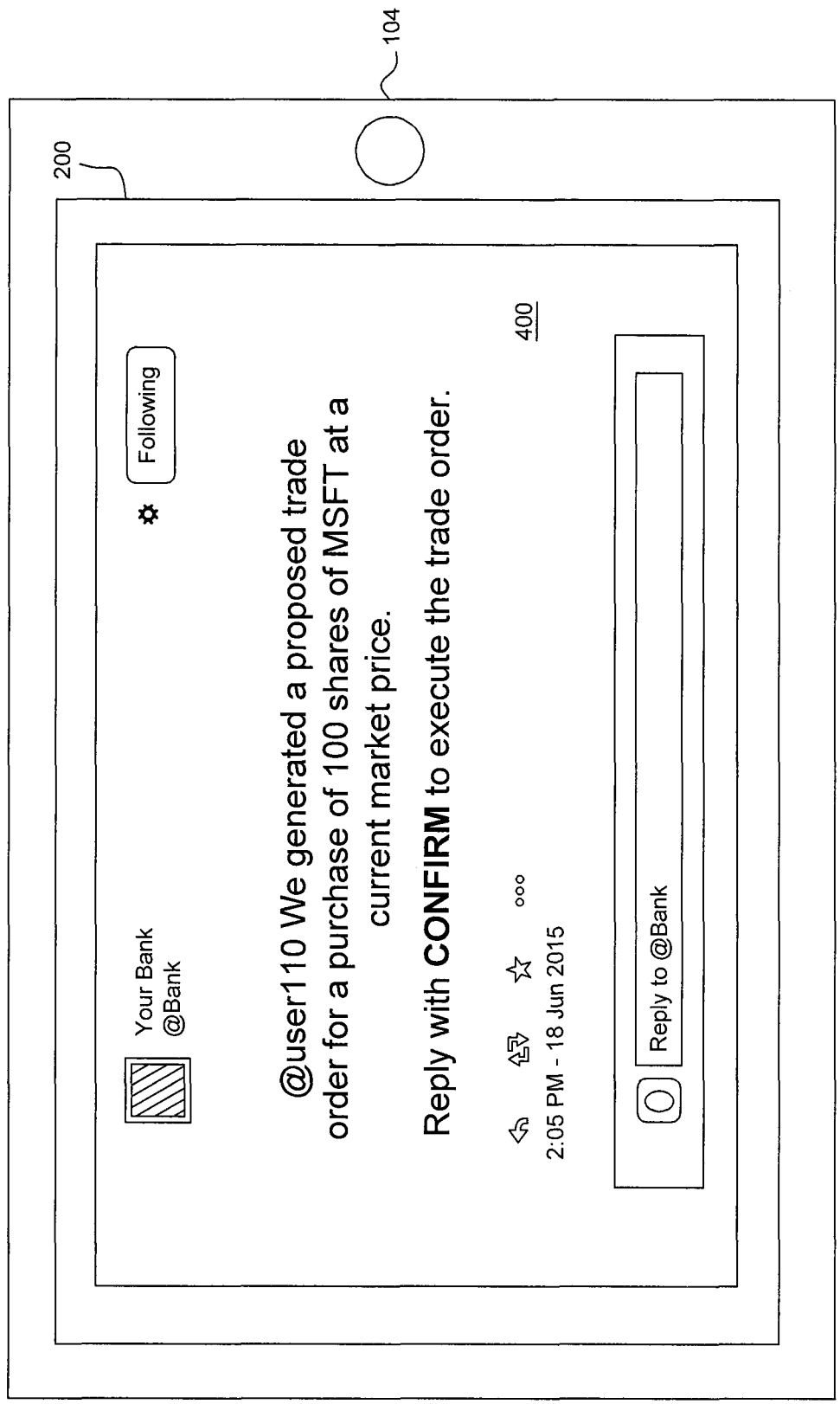
FIGS. 4A and 4B are diagrams of exemplary notifications, consistent with disclosed embodiments.

In certain aspects, system 140 may be configured to transmit a notification of the populated proposed trade order to client device 104 for presentation to user 110 (e.g., in step 316). The notification may, for example, identify the populated parameters of the proposed trade order, and system 140 may be configured to provide the generated notification to social networking system 160 as a social media message directed to user 110 (e.g., as a tweet to Twitter™ handle "@user110", as a posting to user 101's Facebook™ timeline, as a direct social-media message to user 110, etc.). For example, as illustrated in FIG. 4A, system 140 may generate a notification 400 that specifies the populated parameters of user 110's proposed trade order (e.g., "a purchase of 100 shares of MSFT at a current market price"), and further, prompts user 110 to confirm the accuracy of the populated parameters and instruct user 110 to execute the trade order by replying to the notification with the text "CONFIRM." In some aspects, if user 110 were satisfied with the populated parameters of the proposed trade order (e.g., as outlined in notification 400 of FIG. 4A), user 110 may reply to notification 400 with the text "CONFIRM," which client device 104 may transmit to social networking system 160 using any of the communications protocols outlined above.

System 140 may be configured to receive a response to the transmitted notification in step 318. For example, system 140 may receive a response to the notification (e.g., notification 300 delivered to user 110 via Twitter™) as a social media message received through social networking system 160 in a corresponding social media data feed, as described above. Alternatively, system 140 may receive the response to the transmitted notification provided as input by user 110 through a corresponding web page or other interface associated with the financial institution, provided by system 140, and presented to user 110 by client device 104.

If user 110 were to confirm the parameters of the proposed trade order (e.g., step 320; YES), system 140 may be configured to perform processes that execute a trade order in accordance with the confirmed parameters of the proposed trade order (e.g., in step 322). By way of example, system 140 may establish communications with one or more back-end order management systems, and may provide the confirmed parameters of the proposed trade order to the one or more back-end order management and electronic trading systems. In certain instances, the one or more back-end order management and electronic trading systems may initiate the trade order and purchase the 100 shares of Microsoft™ common stock on behalf of user 110.

In certain aspects, system 140 may be configured to transmit a notification of the executed trade order for the purchase of the 100 shares of Microsoft™ common stock to client device 104 for presentation to user 110 (e.g., in step 324). As described above, system 140 may be configured to provide the generated notification to social networking system 160 as a social media message directed to user 110 (e.g., as a tweet to Twitter™ handle "@user110", as a posting to user 110's Facebook™ timeline, etc.).

System 140 may also be configured to determine whether additional ones of the identified and stored social media messages require analysis (e.g., in step 326). If system 140 were to determine that additional social media message require analysis (e.g., step 326; YES), then exemplary method 300 may pass back to step 306, and an additional one of the stored social media messages may be selected and analyzed using any of the exemplary techniques outlined above. If, however, system 140 were to determine that no additional social media messages require analysis, then exemplary method 300 is complete in step 328.

Referring back to step 320, if system 140 fails to receive a confirmation of the parameters of the proposed trade order (e.g., step 320; NO), system 140 may be configured to store information identifying the proposed trade order (e.g., in data repository 144). In certain aspects, user 110 may access a web page or other interface associated with the financial institution (e.g., as provided by system 140 and presented by client device 104), and may view the stored trade order within a corresponding portion of the web page or interface (e.g., user 110's dashboard). User 110 may, for example, delete the stored trade order from the dashboard and additionally or alternatively, request execution of a trade order in accordance with the parameters of the proposed trade order using any of the exemplary techniques outlined above. Further, in additional aspects, system 140 may be able access the dashboard within the web page or interface and modify one or more of the parameters of the proposed trade order before requesting execution. Exemplary method 300 then passes to step 328, and system 140 may be configured to determine whether additional ones of the identified and stored social media messages require analysis, as described above.

Referring back to step 312, if system 140 were to determine that the specified trade parameters do not include at least the essential trade parameters (e.g., step 312; NO), system 140 may be configured to identify the one or more essential trade parameters absent from the specified trade parameters, and transmit a notification of the deficiency to client device 104 for presentation to user 110 (e.g., in step 332). As described above, the deficiency notification may identify the one or more missing essential trade parameters and further, may prompt user 110 to provide the missing essential trade parameters to system 140 in a response to the deficiency notification.

Figure 4B:
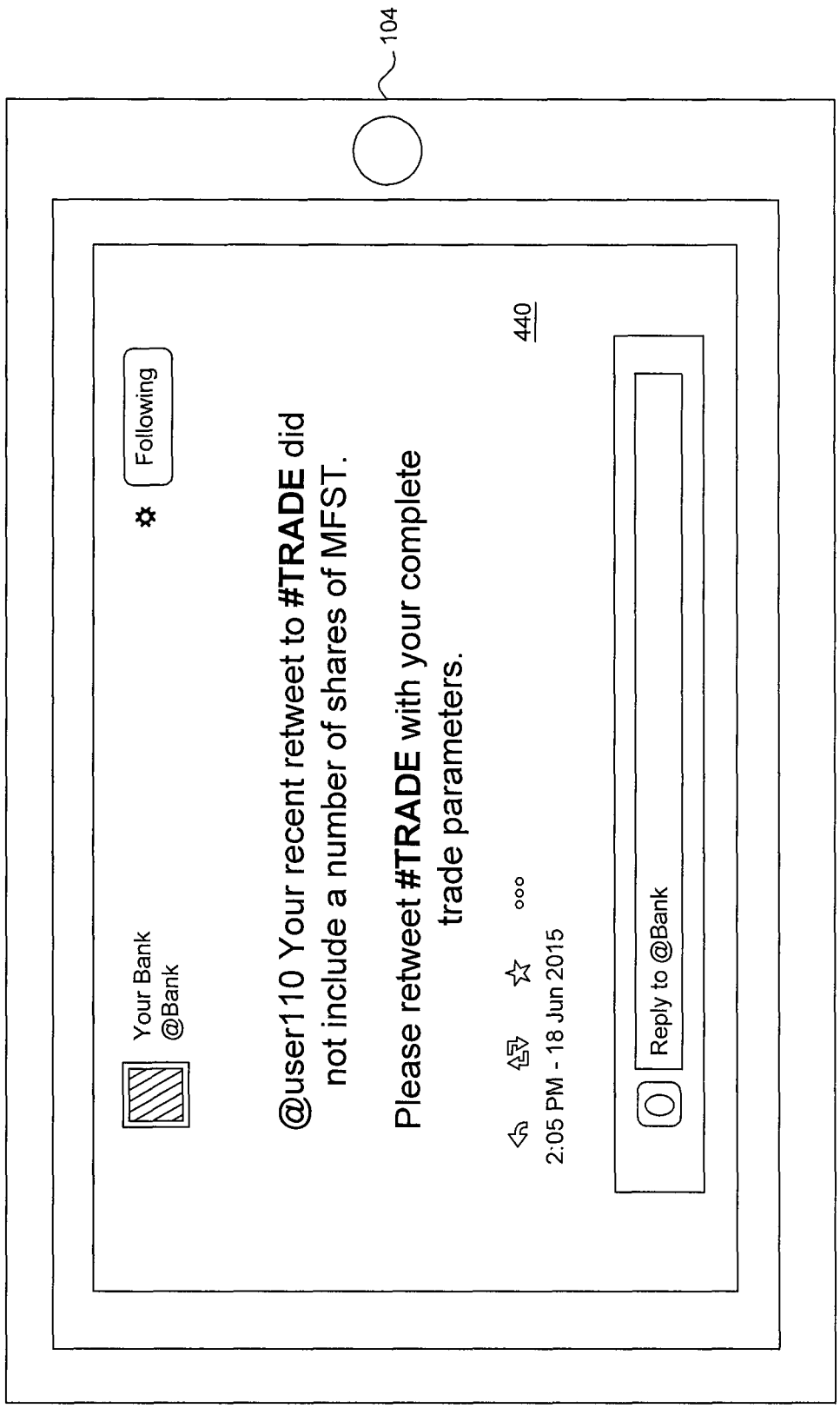

In some aspects, system 140 may be configured to provide the generated deficiency notification to social networking system 160 as a social media message directed to user 110 (e.g., as a tweet to Twitter™ handle "@user110," as a posting to user 110's Facebook™ timeline, etc.). For instance, system 140 may determine that the specified trade parameters identify a transaction type (e.g., a purchase transaction) and a security name (e.g., Microsoft™ common stock having symbol MSFT™), but fail to identify a number of desired shares. For example, as illustrated in FIG. 4B, system 140 may deliver a deficiency notification 440 to user 100 as a social media message (e.g., a tweet delivered to client device 104 by social networking system 160) that identifies the missing essential parameter (e.g., the desired quantity of Microsoft™ common stock), and requests that user 110 retweet the desired trade parameters in conjunction with the hashtag "#TRADE." Referring back to FIG. 3, upon transmission of the deficiency notification requesting the missing trade parameters, exemplary method 300 may pass back to step 302, and system 140 may access and monitor one or more feeds of social media data received from social networking system 160 using any of the exemplary techniques outlined above.

Further, and referring back to step 310, if system 140 were to determine that user 110 is not a customer of the financial institution or alternatively, that user 110 is a customer of the financial institution but did not elect to participate in the disclosed automated, social-media-based trade order entry and execution processes (e.g., step 310; NO), system 140 may be configured to discard the selected social media message (e.g., in step 330). In some aspects (not depicted in FIG. 3), system 140 may be configured to parse the selected social media message to identify information identifying one or more securities (e.g., using any of the exemplary techniques outlined above), and may add the one or more securities to a virtual portfolio of user 110 and/or add the one or more securities to a watchlist of user 110, and may track a performance of the one or more securities within the virtual portfolio and/or the watchlist. In further aspects (not depicted in FIG. 3), system 140 may be configured to transmit, to user 110 using any of the exemplary techniques outlined above, a notification to user 110 that invites user 110 to become a customer of the financial institution and/or to opt-in and participate in the disclosed automated, social-media-based trade order entry and execution processes. Exemplary method 300 may pass back to step 326, and system 140 may determine whether additional ones of the stored social media messages require analysis, as described above.

In the embodiments described above, system 140, in conjunction with social network system 150 and client device 104, enable user 110 to request population of proposed trade orders, view deficiencies in parameters specifying proposed trade order, confirm execution of trade orders, and/or receive notifications of executed trade orders via social media messaging protocols that do not require user 110 to access a web page or other interface associated with the financial institution (e.g., as provided by system 140 and presented by client device 104). These embodiments enable user 110 to rapidly generate, confirm, and execute proposed trade orders in response to information obtained from real-time information sources, such as social networks, without require the burden of traditional web-based trade-order entry processes. In additional embodiments, however, user 110 may elect to access a web page or other interface associated with the financial institution (e.g., as provided by system 140 and presented by client device 104) to view, confirm, and request execution of a proposed trade order within a corresponding portion of the web page or interface, such as user 110's dashboard (e.g., in step 316 of FIG. 3), and additionally or alternatively, to view confirmations of executed trade orders (e.g., in step 324 of FIG. 3) and to view deficiency notifications (e.g., in step 332 of FIG. 3).

In the embodiments described above, system 140 may be configured to generate and transmit various notifications to user 110 as social media messages relayed through social networking system 160 to client device 104. Depending on one or more privacy settings of user 110's social media account, the transmitted notifications may be visible to not only user 110, but also to any individual or entity linked to user 110 through the social network. For example, as described above in FIG. 4A, system 140 may transmit a tweet to user 110 (e.g., to user 110's Twitter™ handle "@user110") confirming the parameters of the proposed trade order. In some instances, depending on a privacy setting associated with user 110's Twitter™ account, the transmitted tweet may be visible to each of user 110's Twitter™ followers.

In some aspects, system 140 may configure social networking system 160 to establish one or more privacy permissions for notifications generated and transmitted as social media messages. For example, system 140 may configure social networking system 160 e.g., through a corresponding API) to transmit the generated notifications as messages visible only to user 110 (e.g., as a "direct message" in Twitter™, Facebook™, or another social network). Additionally or alternatively, system 140 may configure social networking system 160 to broadcast generated notifications to group of users identified by user 110 as being permitted to view the notifications (e.g., a trading group established by user 110 in conjunction with social networking system 160).

Further, as described above in reference to step 310 of FIG. 3, the disclosed embodiments enable system 140 to verify user 110's identify based on an initial authentication of user 110 by social networking system 160 (e.g., as system 140 requires social networking system 160 to authenticate user 110 before forwarding social media messages to the financial institution) and further, a presence of user 110's social networking username or handle (e.g., user 110's Twitter™ handle "@user110," user 101's Facebook™ username, usernames in other social networking platforms, etc.) within customer profile data maintained by system 140 within data repository 144. The disclosed embodiments are not limited to these exemplary verification techniques, and in further embodiments, system 140 may rely on any additional or alternate techniques to verify an identity of user 110 prior to populating a proposed trade order.

By way of example, system 140 may assign a particular alpha-numeric code to user 110 as a social media password included in social media messages forwarded to the financial institution in conjunction with comments requesting purchases or sales of securities. In certain aspects, and upon user 110's registration for digital banking or investment services, system 140 may generate and assign the social media password to user 110, and may provide the social media password to user 110 through out-of-band secure transmission (e.g., by postal mail). For instance, is user 110 were to request a purchase of securities by retweet, system 140 may require that user 110 include, within the comments of the retweet, the hashtag "#Trade" to indicate the retweet represents a request to generate a proposed trade order, the social media or hashtag password, and the requested trade parameters.

In some aspects, system 140 may parse the retweet upon receipt (e.g., in step 308 of FIG. 3) to identify not only user 110's Twitter™ handle and the specified trade parameters, but also to obtain a hashtag or social media password entered by user 110 (e.g., in region 242 of FIGS. 2B and 2C). System 140 may be configured to access an existing social media password assigned to user 110 (e.g., as stored within the customer profile data of data repository 144), and to compare the assigned social media password against the social media password obtained from the retweet to verify user 110's identity (e.g., in step 310 of FIG. 3).

In further embodiments, client device 104 may be configured to perform device-side authentication procedures before client device 104 forwards a social media message requesting purchases or sales of securities to system 160. For example, a social-networking application executed by client device 104 (e.g., a mobile Twitter™ or Facebook™ app) may require a biometric authentication of user 110 upon initiating a retweet with comments requesting purchases or sales of securities (e.g., a thumbprint validation performed by Apple™ Touch ID™). In some instances, client device 104 may be configured to include information indicative of a successful biometric authentication within a header of the retweet, which system 140 may be configured to identify (e.g., in step 308 of FIG. 3) and use to further verify user 110's identity (e.g., in step 310). Further, in additional embodiments, system 140 may be configured to verify user 110's identity in step 310 using any additional or alternate authentication techniques, such as out-band authentication techniques performed by existing systems associated with system 140 or accessible to system 140 across network 120.

In the exemplary embodiments described above, system 140 may be configured to execute a trade order in response to a confirmation by user 110 of a proposed trade order populated based on trade parameters specified by user 110 in a social media message. In other embodiments, system 140 may not require confirmation from user 110, and may instead immediately execute a trade order based on a proposed trade order that include sufficient trade parameters (e.g., step 312 of FIG. 3; YES) and further, conforms to one or more preferences of user 110 as set forth in customer profile data maintained by system 140. By way of example, an in response to a successful generation of a proposed trade order (e.g., in step 314 of FIG. 3), system 140 may access stored customer profile data for user 110. In certain aspects, system 140 may determine whether user 110 specified that system 140 may automatically execute populated trade orders without express confirmation, and if so, whether user 110 limited the automatic execution of proposed trade orders to those having trade parameters that fall within user-specified threshold values (e.g., user-specified floor and/or ceiling prices, etc.) and/or that involved predetermined securities (e.g., user-specified stocks, etc.).

For example, based on the accessed customer profile data, system 140 may determine that user 110 prefers automatic execution of proposed trade orders when a total value of the transaction (including fees), falls within a US $10,000 limit. If system 140 were to determine that a total value of the proposed trade order (e.g., the proposed trade order for a purchase of 100 shares of Microsoft™ common stock generated in step 314 of FIG. 3) falls within the user-specific limit, system 140 may execute a trade order based on the trade parameters set forth in the proposed trade order without prior user confirmation (e.g., in step 322 of FIG. 3) and transmit a notification of the executed trade order to client device 104 (e.g., in step 324 of FIG. 3) using any of the exemplary techniques outlined above.

In the embodiments described above, system 140 may generate a proposed trade order based on data extracted from one or more social media messages generated by user 110 and transmitted to system 140 by client device 104. For example, user 110 may provide input causing client device 104 to retweet a prior tweet with an element of predetermined content (e.g., a hashtag "#Trade") that identifies the retweet as a request for a proposed trade order, and additionally or alternatively, input causing client device 104 to share a prior posting on user 110's Facebook™ timeline with the predetermined content element. In some instances, system 140 may parse the retweet or shared posting (or other social media message) extract trade parameters for inclusion within the proposed trade order using any of the exemplary techniques described above. The disclosed embodiments are, however, not limited to transactions to purchase and/or sell securities in accordance with parameters extracted from social media messages, and in other embodiments, user 110 may include predetermined content within social media messages (e.g., hashtags within retweets) that cause system 140 to perform other actions involving one or more securities based on parameters extracted from the social media messages.

For example, user 110 may provide input to client device 104 that includes "#Virtual" within a retweet (e.g., within a comment region 242 of retweet interface 240 of FIGS. 2C and 2E) or within a shared posting (e.g., within a comment region 243 of interface 241 of FIG. 2D). In certain aspects, and upon transmission of the retweet to a corresponding social network, system 140 obtain the retweet using any of the exemplary techniques described above, and based on the presence of "#Virtual" within the retweet or shared posting, determine that the retweet or shared posting represents a request from user 110 to add one or more securities to a virtual portfolio held by user 110. Using any of the exemplary techniques outlined above, system 140 may parse the obtained social media message (e.g., the retweet or shared posting) to identify information identifying one or more securities for inclusion in the virtual portfolio and one or more of the trade parameters (e.g., as described above), and may modify portions of stored data to establish the one or more securities within user 110's virtual portfolio in accordance with the identified trade parameters. In some aspects, while the virtual account of user 110 may operate in a manner similar to one or more of user 110's actual investment accounts, a balance associated with the virtual account is not convertible an equivalent value in a denominated currency. Further, virtual accounts consistent with the disclosed embodiments may include fewer account properties designed to protect the ownership of the value of comparable actual investment accounts, such as ownership, tax treatment, power of attorney, trading authority, etc.

In other aspects, user 110 may provide input to client device 104 that includes "#Watch" within a retweet (e.g., within comment region 242 of retweet interface 240 of FIGS. 2C and 2E) or within a shared posting (e.g., within comment region 243 of interface 241 of FIG. 2D). Upon transmission of the retweet to system 140 through a corresponding social network, system 140 obtain the retweet using any of the exemplary techniques described above, and based on the presence of "#Watch" within the retweet or shared posting, determine that the retweet represents a request from user 110 to add one or more securities to a watchlist maintained by system 140 on behalf of user 110. Using any of the exemplary techniques outlined above, system 140 may parse the obtained social media message (e.g., the retweet or shared posting) to identify information identifying one or more securities for inclusion in the watchlist and one or more of the trade parameters (e.g., as described above), and may modify portions of stored data to establish the one or more securities within user 110's watchlist in accordance with the identified trade parameters.

In certain instances, the stored data establishing the watchlist (or watchlists) of user 110 may include a subset of the data required to establish user 110's virtual investment portfolio (e.g., a watchlist name, the list of securities being followed, the current market prices, and/or other market data). In other aspects, however, watchlist data consistent with the disclosed embodiments and maintained by system 140 may include additional data that provides functionality similar to that of user 110's practice account (e.g., a quantity of the securities, sentiment information (e.g., user 110's view of whether the securities will appreciate or depreciate in value), information indicative of user 110's intention to buy or sell one of the securities, a market price at which one or more of the securities were added to user 110's watchlist by system 140, and/or performance data indicative of a performance of one or more of the securities since their addition to the watchlist and corresponding profits/losses against user 110's prediction).

The disclosed embodiments are, however, not limited to actions that include adding securities to virtual portfolios and adding securities to watchlists. In further embodiments, user 110 may provide input to client device 104 that adds predetermined content and/or hashtags to social media messages and retweets indicative of request by user 110 to perform additional or alternative actions involving one or more securities, such as charting a performance of the one or more securities and/or generating a quote for the one or more securities.

Further, although the described in terms of particular social networks (e.g., Twitter™ or Facebook™), the disclosed exemplary embodiments are not limited to any particular social network. In additional embodiments, the exemplary automated, social-media-based trade order entry and execution processes describe above may operate in conjunction with any additional or alternate social network apparent to one of skill in the art and accessible to system 140 through social networking system 160, including, but not limited to, FourSquare™, LinkedIn™, Tumblr™, Instagram™, and Snapchat™.

In certain implementations, one or more of the exemplary computer-implemented systems and processes described above may automate an entry of an order on behalf of a customer, and additionally or alternatively, may automate processes that execution of the entered order, based on the customer's interaction with one or more social networks (e.g., Twitter™, Facebook™, FourSquare™, LinkedIn™, Instagram™, Snapchat™, etc.). These exemplary computer-implemented systems and methods may, in some instances, be used instead of or in addition to other conventional order entry and generation processes, which require customers to specify order parameters within graphical user interfaces presented by devices, such as mobile or wearable devices, that are characterized by touchscreen displays of limited size and by variable connectivity to communications networks. In some instances, the exemplary computer-implemented systems and methods described above may address certain deficiencies of these conventional processes in a technical manner by providing improved interfaces that facilitate efficient interaction between a user and computing systems that generate, process, and execute customer orders, even using mobile or wearable devices with limited display resolution and network connectivity, and further, by improving a speed and efficiency at which these computing systems operate to generate, process, and execute customer orders.

By way of example, and as described above, a user's mobile device (e.g., client device 104 operated by user 110) may execute an application associated with a particular social network and present social media data (such as tweets, timeline posts, etc.) within a corresponding graphical user interface. Further, and based on portions of the presented social media data, user 110 may elect to modify a held or virtual position in one or more securities. To initiate a purchase or sale of the desired securities via the conventional and/or existing processes described above, user 110 exits the social media application executed by client device 104, and accesses a digital portal provided by user 110's financial institution (e.g., through a web page or GUI presented by client device 104), and further, manually inputs the trade parameters into the digital portal to initiate the purchase of the desired securities.

As described above, this process is cumbersome and time-consuming, especially when performed on mobile devices with touchscreen displays of limited size and variable network connectivity. Further, the manual input of trade parameters into an order-entry interface may be prone to error, due in part to restrictions on a size of the presented interface, and the resulting order data generated by client device 104 and transmitted to system 140 may include errors in certain trade parameters, such as a symbol or identifier of the desired securities, quantities of the desired security, or data identifying a time or schedule of a transaction. In some aspects, these conventional, manual order-entry processes may result in a mismatch between the order-entry speed and the speed at which the trading platform matches orders and executes trades, and may result in unfulfilled orders.

In certain aspects, the disclosed embodiments enable user 110 to input order or trade parameters not through a corresponding order-entry interface, which may be ill-suited to the limited resolution or connectivity of mobile or wearable devices, but instead through an executed social media application, the operation of which may be optimized for the presentation and connectivity characteristics of the mobile or wearable devices. In further aspects, the messaging capabilities of the executed social media application, which generate graphical user interfaces (GUIs) that accept natural-language input specifying one or more trade parameters (e.g., "Buy 100 Shares of Microsoft") instead of input having interface-specific or platform-specific formats, facilitate an improved interaction between user 110 and system 140 in response to presented social media data without requiring the user to cycle between the social-media and order-entry interfaces. Further, system 140 may process the natural-language input (and additionally or alternatively, contextual data associated with shared social-media messages (e.g., retweets, shared postings, etc.)) to generate order data that conforms to the various interface-specific or platform-specific formats, thus reducing the occurrences of erroneous order data common in the conventional processes described above.

Further, the automatic generation of order data based on shared social media messages (e.g., retweets, shared postings, etc.), and the resulting reduction in the occurrences of errors within the generated order data, may improve an operation of system 140. For example, upon receipt of order data from client device 104, system 140 may store portions of the received order data (e.g., within data repository 144) and queue the received order data in a corresponding order queue based on a time and date of receipt. Server 142 may obtain portions of the order data from the queue, and based on an analysis of the selected order data portions, may adaptively route the selected order data portions to one or more back-end systems capable of executing the corresponding order on behalf of the customer. Prior to routing the selected order data to the one or more back-end systems, server 142 may parse the selected order data portions and establish that the parsed data conforms to the various interface-specific or platform-specific formats and as such, is error free.

If server 142 were to detect an error within the selected order data portion (e.g., a trade parameter not conforming to the various interface-specific or platform-specific formats), server 142 may perform additional operations that modify the selected order data portions to mediate the detected error based on predetermined logic or based on additional order data received from client device 104. The detection of errors within the queued order data and the performance of operations that mediate the detected errors may collectively reduce a speed at which system 140 processes and routes the queued storage data, and in particular, those portions of the queued order data that include erroneous trade parameters. Further, the delay resulting from the detection and mediation of the erroneous order data may impact an ability of system 140 to route incoming orders to back-end systems capable of executing the incoming orders during rapidly changing market conditions.

For example, the disclosed embodiments may automatically generate order data on behalf of user 110 based on, among other things, user 110's interaction with one or more one or more social networks. As described above, the automatically generated order data may conform to the various interface-specific or platform-specific formats and to the user's intensions, and based on a corresponding position within the order queue, system 140 may route the automatically generated order data to the one or more back-end systems for order execution. The conformance of the automatically generated order data to the various interface-specific or platform-specific formats may reduce the operational overhead of server 142 and reduce a number of operations consumed by error detection and mediation processes described above, thus increasing a speed and an efficiency at which server 142 routes queued order data to the back-end systems. The increase in speed may reduce the mismatch between the order-entry speed and the speed at which the trading platform matches orders and executes trades, and may improve the operation of system 140 and result in an increased number of fulfilled orders.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications module;
at least one processor coupled to the communications module; and
a memory coupled to the at least one processor and storing executable instructions that, when executed by the at least one processor, cause the at least one processor to:
receive social media data from at least one social networking server through the communications module, the social networking server being connected to the apparatus across a communications network, and the social media data comprising a plurality of social media messages;
detect an occurrence of at least one predetermined element of content within a first one of the social media messages, the first social media message being associated with a social networking account, and the predetermined content element specifying a performance of at least one action;
extract, from the first social media message, data identifying at least one parameter of the action, and parse the first social media message to identify a candidate social media password;
determine that the candidate social media password corresponds to a social media password assigned to a user associated with the social networking account;
verify an identity of the user in response to the determination;
based on the verified identity, generate proposed parameters for the action based on at least the extracted data, the proposed parameters comprising the at least one parameter extracted from the social media message;
receive, from a device associated with the social networking account, information confirming the proposed parameters; and
generate one or more electronic commands to initiate the performance of the action in accordance with the confirmed parameters.

2. The apparatus of claim 1, wherein:
the first social media message is generated by the device; and
the first social media message comprises a retweet of a second social media message.

3. The apparatus of claim 1, wherein:
the action comprises a transaction to purchase or sell one or more securities;
the at least one parameter comprises one or more trade parameters;
the proposed parameters comprise one or more proposed trade parameters; and
at least one of the trade parameters or the proposed trade parameters comprises an identifier of the one or more securities, a type of transaction, a quantity of the one or more securities, a price type, information identifying a triggering event initiating a transfer of a trade order to a market, a period validity of the trade order, instructions associated with the market, or an account associated with the trade order.

4. The apparatus of claim 1, wherein:
the action comprises an addition of one or more securities to a virtual portfolio or a held watchlist; and
the executed instructions further cause the at least one processor to:
access stored data associated with the virtual portfolio or the watchlist; and
modify at least a portion of the stored data to include information identifying the one or more securities.

5. The apparatus of claim 1, wherein:
the first social media message includes textual data, the textual data comprising the at least one parameter; and
the executed instructions further cause the at least one processor to parse the textual data to extract the at least one parameter from the first social media message.

6. The apparatus of claim 1, wherein:
the first predetermined content element comprises a predetermined hashtag; and
the executed instructions further cause the at least one processor to:
identify a subset of the social media messages that are associated with the social networking account of the user;
detect an occurrence of the predetermined hashtag within a corresponding one of the social media messages; and
establish the corresponding one of the social media messages as the first social media message.

7. The apparatus of claim 1, wherein the executed instructions further cause the at least one processor to:
generate a first message that includes the proposed parameters;
transmit the first message to the device; and
receive a second message from the device that includes the information confirming the proposed parameters.

8. The apparatus of claim 1, wherein the executed instructions further cause the at least one processor to:
determine that the at least one parameter includes a set of predetermined parameters, the set of predetermined parameters comprising at least one of names of the one or more securities, symbols of the one or more securities, a transaction type, or quantities of units of the one or more securities; and
in response to the determination, generate proposed parameters based on the first social media message.

9. The apparatus of claim 8, wherein the executed instructions further cause the at least one processor to:
determine that the at least one parameter fails to include the set of predetermined parameters;
identify one or more of the set of predetermined parameters that are absent from the at least one parameter; and
provide a message to the device requesting the absent ones of the set of predetermined parameters.

10. The apparatus of claim 1, wherein the first social media message comprises a portion of a second social media message, the second social media message being associated with a second social networking account.

11. The apparatus of claim 1, wherein:
the first social media message includes graphical data; and
the executed instructions further cause the at least one processor to process the graphical data to extract the at least one transaction parameter from the first social media message.

12. The apparatus of claim 1, wherein the executed instructions further cause the at least one processor to:
assign the social media password to the user associated with the social networking account, the social media password comprising an alphanumeric code; and
storing the assigned social media password within a portion of the memory associated with the social networking account.

13. A computer-implemented method, comprising:
receiving, by one or more processors, social media data from at least one social-networking server across a communications network, the social media data comprising a plurality of social media messages;
detecting, by the one or more processors, an occurrence of at least one predetermined element of content within a first one of the social media messages, the first social media message being associated with a social networking account, and the predetermined content element specifying a performance of at least one action;
extracting, by the one or more processors, and from the first social media message, data identifying at least one parameter of the action and parsing, by the one or more processors, the first social media message to identify a candidate social media password;
determining, by the one or more processors, that the candidate social media password corresponds to a social media password assigned to a user associated with the social networking account;
verifying, by the one or more processors, an identity of the user in response to the determination;
based on the verified identity, generating, by the one or more processors, proposed parameters for the action based on at least the extracted data, the proposed parameters comprising the at least one parameter extracted from the social media message;
receiving, by the one or more processors, and from a device associated with the social networking account, information confirming the proposed parameters; and
generating, by the one or more processors, one or more electronic commands to initiate the performance of the action in accordance with the confirmed parameters.

14. The method of claim 13, wherein:
the first social media message is generated by the device; and
the first social media message comprises a retweet of a second social media tweet.

15. The method of claim 13, wherein:
the first social media message includes textual data, the textual data comprising the at least one parameter; and
the method further comprises parsing the textual data to extract the at least one parameter from the first social media message.

16. The method of claim 13, wherein:
the social media message includes graphical data; and
the method further comprises processing the graphical data to extract the at least one transaction parameter from the first social media message.

17. The method of claim 13, wherein:
the first predetermined content element comprises a predetermined hashtag; and
the method further comprises:
identifying a subset of the social media messages that are associated with the social networking account;
detecting an occurrence of the predetermined hashtag within a corresponding one of the subset of the social media messages; and
establishing the corresponding one of the subset of the social media messages as the first social media message.

18. The method of claim 13, wherein:
the action comprises a transaction to purchase or sell one or more securities;
the at least one parameter comprises one or more trade parameters;
the proposed parameters comprise one or more proposed trade parameters; and
at least one of the trade parameters or the proposed trade parameters comprises an identifier of the one or more securities, a type of transaction, a quantity of the one or more securities, a price type, information identifying a triggering event initiating a transfer of a trade order to a market, a period validity of the trade order, instructions associated with the market, or an account associated with the trade order.

19. The method of claim 13, wherein:
the action comprises an addition of one or more securities to a virtual portfolio or a held watchlist; and
the method further comprises:
accessing stored data associated with the virtual portfolio or the watchlist; and
modifying at least a portion of the stored data to include information identifying the one or more securities.

20. A system, comprising:
a first computing device that receives social media data from at least one social networking server across a communications network, the social media data comprising a plurality of social media messages;
a second computing device connected to the first computing device across the communications network, wherein the second computing device comprises:
at least one processor; and
a memory coupled to the at least one processor and for storing executable instructions that, when executed by the at least one processor, cause the at least one processor to:
detect an occurrence of at least one predetermined element of content within a first one of the social media messages received by the first computing device, the first social media message being associated with a social networking account, and the predetermined content element specifying a performance of at least one action;
extract, from the first social media message, data identifying at least one parameter of the action and parse the first social media message to identify a candidate social media password;
determine that the candidate social media password corresponds to a social media password assigned to a user associated with the social networking account;
verify an identity of the user in response to the determination;
based on the verified identity, generate proposed parameters for the action based on at least the extracted data, the proposed parameters comprising the at least one parameter extracted from the social media message;
receive, from a device associated with the social networking account, information confirming the proposed parameters; and generate one or more electronic commands to initiate the performance of the action in accordance with the confirmed parameters.

* * * * *